(12) United States Patent
Wakabayashi

(10) Patent No.: US 7,859,630 B2
(45) Date of Patent: Dec. 28, 2010

(54) ELECTRIC FIELD DRIVING DEVICE, LIQUID CRYSTAL DEVICE AND ELECTRONIC APPARATUS

(75) Inventor: Junichi Wakabayashi, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 372 days.

(21) Appl. No.: 12/053,304

(22) Filed: Mar. 21, 2008

(65) Prior Publication Data

US 2009/0009671 A1 Jan. 8, 2009

(30) Foreign Application Priority Data

Mar. 30, 2007 (JP) ............................. 2007-090962
Nov. 19, 2007 (JP) ............................. 2007-298918

(51) Int. Cl.
*G02F 1/1343* (2006.01)
(52) U.S. Cl. ........................ 349/141; 349/139; 349/106
(58) Field of Classification Search ................ 349/141, 349/139, 146, 143, 129, 106, 178
See application file for complete search history.

(56) References Cited

U.S. PATENT DOCUMENTS

2007/0242204 A1* 10/2007 Fujita et al. ................. 349/141

FOREIGN PATENT DOCUMENTS

JP A-2000-29072 1/2000

* cited by examiner

*Primary Examiner*—Thoi V Duong
(74) *Attorney, Agent, or Firm*—Oliff & Berridge, PLC

(57) ABSTRACT

An electric field driving device, comprising a plurality of pixels formed of two or more sub-pixels corresponding to different colors from one another, includes pixel electrodes, a common electrode, an insulating layer between the pixel electrodes and the common electrode, and a material driven by an electric field generated between each of the pixel electrodes and the common electrode. Each of the pixel electrodes is formed in correspondence with the sub-pixel. The common electrode is formed above the pixel electrodes and has a plurality of slits. At least a portion of the slits in each of the sub-pixels are parallel to one another and include a continuous portion that extends in a straight line over the plurality of sub-pixels included in one pixel of the pixels and arranged adjacent to one another. Extending directions of the continuous portion of adjacent pixels are different from each other.

18 Claims, 15 Drawing Sheets

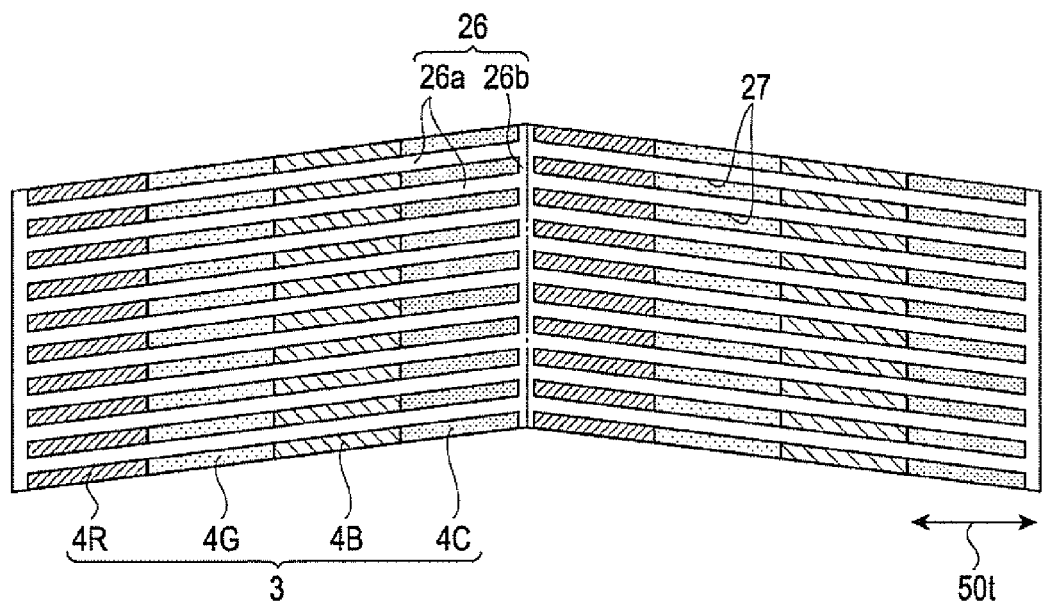
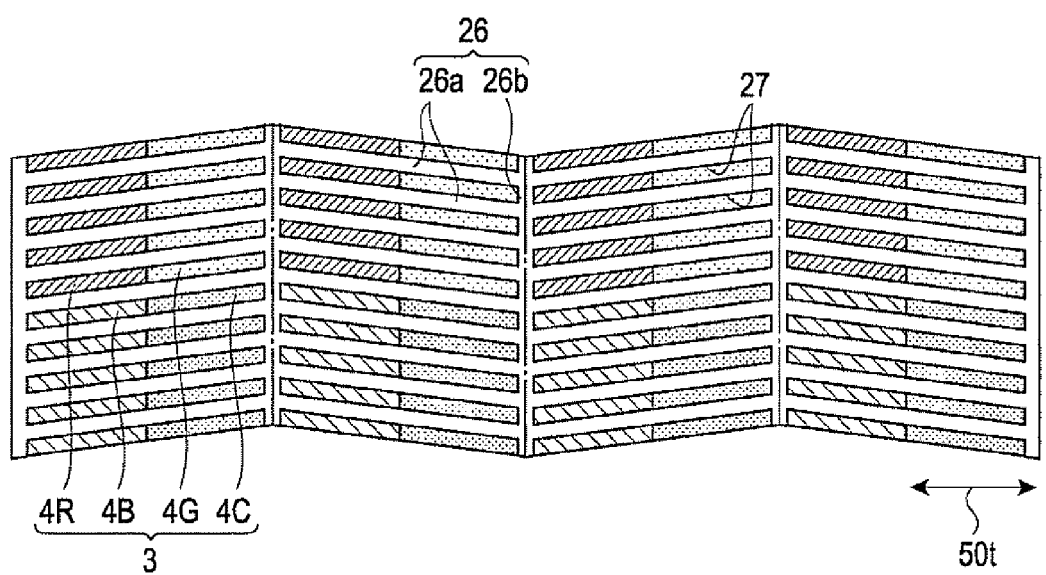

ELECTRIC FIELD DRIVING DEVICE, LIQUID CRYSTAL DEVICE AND ELECTRONIC APPARATUS

This application claims priority from Japanese Patent Application No. 2007-090962 filed in the Japanese Patent Office on Mar. 30, 2007 and Japanese Patent Application No. 2007-298918 filed in the Japanese Patent Office on Nov. 19, 2007, the entire disclosures of which are hereby incorporated by reference in their entireties.

BACKGROUND

1. Technical Field

The present invention relates to an electric field driving device, a liquid crystal device and an electronic apparatus.

2. Related Art

A liquid crystal device is one of electric field driving devices and modulates transmitted light by driving a liquid crystal using an electric field. One embodiment of the liquid crystal device is known as an FFS (Fringe Field Switching) mode liquid crystal device that drives a liquid crystal using a lateral electric field that is parallel to the substrates of the liquid crystal device. The liquid crystal device includes pixel electrodes and a common electrode. The pixel electrodes are provided on a face of one of the substrates, which faces the liquid crystal. The common electrode is laminated on the pixel electrodes via an insulating layer. Among these electrodes, the common electrode has a large number of slits formed therein. In the above described configuration, as a driving voltage is applied between the pixel electrodes and the common electrode, an electric field that has a line of electric force, extending from the upper face of the common electrode through the slits to the upper face of the pixel electrodes, is generated. At this time, liquid crystal molecules are driven by a component of the electric field, which is parallel to the substrates (lateral electric field) and generated above the common electrode, and thereby the alignment direction of the liquid crystal molecules are changed. In this manner, the FFS mode liquid crystal device drives the liquid crystal molecule and modulates incident light using the polarization conversion function.

FIG. 17A and FIG. 17B are enlarged plan views that focus on one of slits 27 formed in a common electrode 26 in an FFS mode liquid crystal device. FIG. 17A is a view that shows a state when no voltage is applied. A liquid crystal molecule 50a is aligned parallel to an X-axis, while the slit 27 extends in a direction (direction D) that is inclined to the X-axis. Here, when a driving voltage is applied, a lateral electric field is generated in a direction (direction C) perpendicular to the direction in which the slit 27 extends. As a result, the liquid crystal molecule 50a is rotated in a clockwise direction and then is aligned, for example, parallel to the lateral electric field, that is, along the direction C (see FIG. 17B).

At this time, a hue appears differently between when a display is viewed from a direction E parallel to the direction C and when a display is viewed from a direction F that is symmetrical to the direction E with respect to Y-axis because the apparent refractive index of the liquid crystal molecule 50a is different therebetween. For a similar reason, a hue appears differently between when a display is viewed from a direction G parallel to the direction D and when a display is viewed from a direction H that is symmetrical to the direction C with respect to Y-axis.

In order to improve such viewing angle dependency of a display color, a configuration has been proposed, as shown in FIG. 18, in which the extending direction in which the slits 27 are formed in the common electrode 26 is alternately changed for sub-pixels 4R, 4G, 4B corresponding to red, green and blue, which is described in JP-A-2000-29072.

However, in the above configuration, because the slits are bent at boundaries between the adjacent sub-pixels, there is a problem that a domain of the liquid crystal is likely to be produced owing to a disturbance of an electric field. In addition, when sub-pixels corresponding to even-numbered colors are arranged repeatedly in a line, there is a problem that the alignment direction of the liquid crystal matches between the sub-pixels corresponding to the same color and, as a result, viewing angle dependency of display color is not improved.

SUMMARY

An advantage of some aspects of the invention is to implement the following aspects or application examples.

FIRST APPLICATION EXAMPLE

An aspect of the invention provides an electric field driving device in which a plurality of pixels, each of which is formed of two or more sub-pixels that respectively correspond to different colors from one another, are arranged in a matrix in a pixel region on a substrate. The electric field driving device includes pixel electrodes, a common electrode, an insulating layer, and a material. Each of the pixel electrodes is formed in correspondence with the sub-pixel on the substrate. The common electrode is formed above the pixel electrodes on the substrate so that at least part of the common electrode overlaps each of the pixel electrodes in plan view, and has a plurality of slits. The insulating layer is formed on the substrate between the pixel electrodes and the common electrode. The material is driven by an electric field that is generated on the basis of a difference in electric potential between each of the pixel electrodes and the common electrode. The plurality of slits at least partly overlap each of the pixel electrodes in plan view. At least a portion of the slits in each of the sub-pixels are parallel to one another and include a continuous portion that extends in a straight line over the plurality of sub-pixels that are included in one pixel of the pixels and arranged adjacent to one another. An extending direction in which the continuous portion that is included in the one pixel extends and an extending direction in which the continuous portion that is included in at least one of the pixels arranged adjacent to the one pixel extends are different from each other.

According to the above configuration, the extending direction in which the continuous portion of the slits extends is different between the adjacent pixels. Thus, it is possible to differentiate the extending direction of the slits between the sub-pixels included in the adjacent pixels and corresponding to the same color. In this manner, it is possible to differentiate the direction of an electric field applied to the material among the sub-pixels corresponding to the same color, and it is possible to reduce the viewing angle dependency of display color. In addition, the slits extend continuously over the plurality of sub-pixels, so that, in comparison with the configuration in which the slits are provided separately for each sub-pixel, it is possible to reduce the number of end portions of the slits that disturb an electric field. In this manner, it is possible to reduce the area of a region in which an electric field is disturbed and, hence, the display quality of the electric field driving device may be improved.

SECOND APPLICATION EXAMPLE

In the above electric field driving device, the extending direction of the continuous portion that is included in the one pixel and the extending direction of the continuous portion that is included in the at least one of the pixels arranged adjacent to the one pixel may be in symmetry with respect to a boundary between the pixels arranged adjacent to each other.

According to the above configuration, the direction of an electric field applied to the material in each of the pixels makes the same angle with respect to the boundary. In this manner, it is possible to apply an electric field that is uniformly applied to the material of each sub-pixel while reducing the viewing angle dependency.

THIRD APPLICATION EXAMPLE

In the above electric field driving device, each of the pixels may be formed in a parallelogram, and the slits may be parallel to at least one of sides of the parallelogram. According to the above configuration, because two sides of each pixel are parallel to the slits, in comparison with the case where the two sides are not parallel to the slits, it is possible to reduce the area of a region in which an electric field is disturbed in each of the pixels.

FOURTH APPLICATION EXAMPLE

In the above electric field driving device, the extending direction of the continuous portion may be different among the n pixels that are arranged adjacent to one another in a line, and the continuous portions having the same extending direction are repeatedly arranged every n pixels in a line of the pixels.

According to the above described configuration, it is possible to variously change the direction of an electric field every pixel. Thus, it is possible to further reduce the viewing angle dependency.

FIFTH APPLICATION EXAMPLE

In the above electric field driving device, the continuous portion may extend over the entire pixel.

According to the above configuration, the slits are not bent in each of the pixels, and no end portions of the slits are arranged in a region of each pixel excepting the outer periphery of each pixel. In this manner, it is possible to reduce the area of a region in which an electric field is disturbed and, hence, the display quality of the electric field driving device may be improved.

SIXTH APPLICATION EXAMPLE

An aspect of the invention provides a liquid crystal device in which a plurality of pixels, each of which is formed of two or more sub-pixels that respectively correspond to different colors from one another, are arranged in a matrix in a pixel region on a substrate. The liquid crystal device includes pixel electrodes, a common electrode, an insulating layer, and a liquid crystal. Each of the pixel electrodes is formed in correspondence with the sub-pixel on the substrate. The common electrode is formed above each of the pixel electrodes on the substrate so that at least part of the common electrode overlaps each of the pixel electrodes in plan view, and has a plurality of slits. The insulating layer is formed on the substrate between the pixel electrodes and the common electrode. The liquid crystal is driven by an electric field that is generated on the basis of a difference in electric potential between each of the pixel electrodes and the common electrode. The plurality of slits at least partly overlap each of the pixel electrodes. At least a portion of the slits are parallel to one another in each of the sub-pixels and include a continuous portion that extends in a straight line over the plurality of sub-pixels that are included in each of the pixels and arranged adjacent to one another. An extending direction in which the continuous portion that is included in one pixel extends and an extending direction in which the continuous portion that is included in at least one of the pixels arranged adjacent to the one pixel extends are different from each other, and are in symmetry with respect to an alignment direction of the liquid crystal when the electric field is not applied.

According to the above configuration, the extending direction in which the continuous portion of the slits extends is different between the adjacent pixels. Thus, it is possible to differentiate the extending direction of the slits between the sub-pixels included in the adjacent pixels and corresponding to the same color. In this manner, it is possible to differentiate the direction of an electric field applied to the liquid crystal among the sub-pixels corresponding to the same color, and it is possible to reduce the viewing angle dependency of display color. In addition, according to the above configuration, the direction of an electric field applied to the liquid crystal in each of the pixels makes the same angle with respect to the alignment direction when no electric field is applied. In this manner, it is possible to apply an electric field that uniformly changes alignment (rotates liquid crystal molecules) of the liquid crystal in each of the sub-pixels while reducing the viewing angle dependency. In addition, the slits extend continuously over the plurality of sub-pixels, so that, in comparison with the configuration in which the slits are provided separately for each sub-pixel, it is possible to reduce the number of end portions of the slits that disturb the alignment of liquid crystal. In this manner, it is possible to reduce the area of a region in which the alignment of the liquid crystal is disturbed and, hence, the display quality and transmittance ratio of the liquid crystal device may be improved.

SEVENTH APPLICATION EXAMPLE

In the above liquid crystal device, an angle that the extending direction of the continuous portion makes with the alignment direction may be larger than 0 degree and smaller than 45 degrees, and the liquid crystal may have a positive anisotropy of dielectric constant.

According to the above configuration, the rotational angle of the liquid crystal molecules by an electric field may be set smaller than 45 degrees, so that it is possible to uniform the rotational directions of the liquid crystal molecules. Thus, it is possible to suppress generation of a domain due to ununiform rotational directions of the liquid crystal molecules.

EIGHTH APPLICATION EXAMPLE

In the above liquid crystal device, an angle that the extending direction of the continuous portion makes with the alignment direction may be larger than 45 degrees and smaller than 90 degrees, and the liquid crystal may have a negative anisotropy of dielectric constant.

According to the above configuration, the rotational angle of the liquid crystal molecules by an electric field may be set smaller than 45 degrees, so that it is possible to uniform the rotational directions of the liquid crystal molecules. Thus, it is possible to suppress generation of a domain due to ununiform rotational directions of the liquid crystal molecules.

NINTH APPLICATION EXAMPLE

In the above liquid crystal device, the liquid crystal device may further include a scanning line or scanning lines that are arranged parallel to the alignment direction.

According to the above configuration, it is possible to arrange the scanning line or scanning lines without reducing an effective display area in the pixel region.

TENTH APPLICATION EXAMPLE

In the above liquid crystal device, the liquid crystal device may further include a signal line or signal lines that are arranged parallel to the alignment direction.

According to the above configuration, it is possible to arrange the signal line or signal lines without reducing an effective display area in the pixel region.

ELEVENTH APPLICATION EXAMPLE

An aspect of the invention provides an electronic apparatus that uses the electric field driving device as a display portion.

With the above configuration, it is possible to perform displaying with less viewing angle dependency of display color.

TWELFTH APPLICATION EXAMPLE

An aspect of the invention provides an electronic apparatus that uses the liquid crystal device as a display portion.

With the above configuration, it is possible to perform displaying with less viewing angle dependency of display color.

BRIEF DESCRIPTION OF THE DRAWINGS

The invention will be described with reference to the accompanying drawings, wherein like numbers reference like elements.

FIG. 1A;

FIG. 4;

FIG. 12A and FIG. 12B are enlarged plan views that show the shape of pixels and the state of arrangement of a common electrode and slits in a liquid crystal device according to a sixth embodiment;

DETAILED DESCRIPTION OF EMBODIMENTS

Figure 1A:
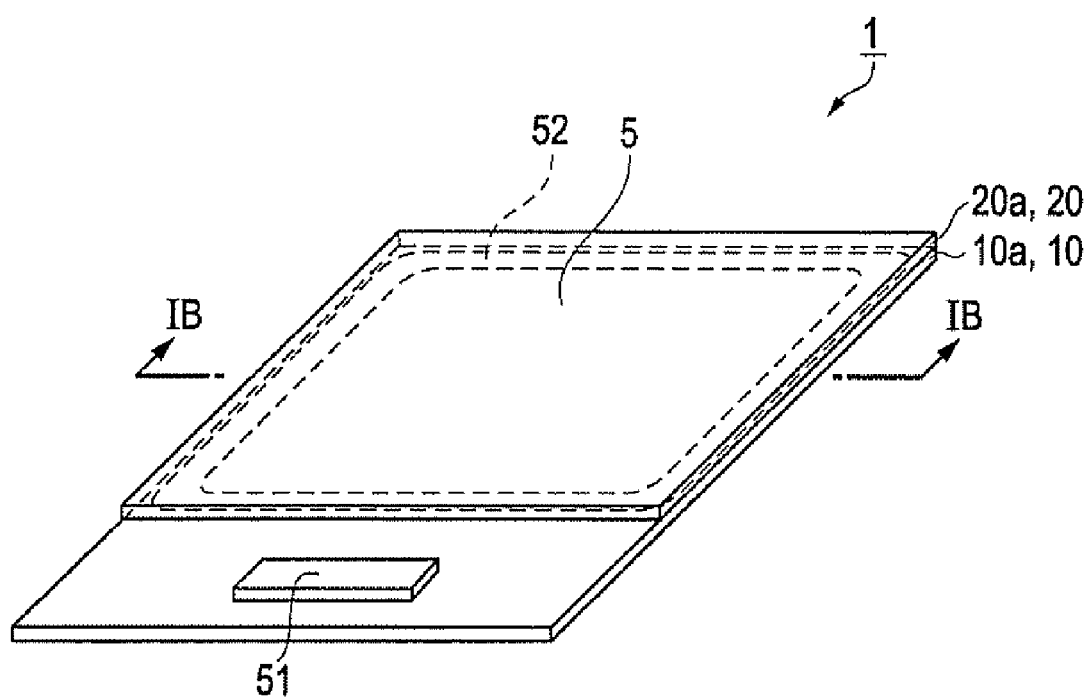
FIG. 1A is a schematic perspective view of a liquid crystal device, which serves as an electric field driving device.

Hereinafter, embodiments of an electric field driving device, a liquid crystal device and an electronic apparatus will be described with reference to the accompanying drawings. Note that, in the accompanying drawings, to make it easier to recognize the components in the drawings, the dimensions and ratio of the components are appropriately varied from those of the actual components.

First Embodiment

Figure 1B:
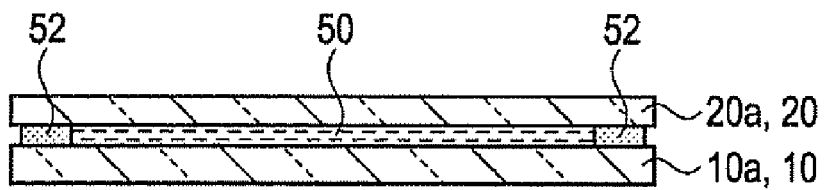
FIG. 1B is a cross-sectional view that is taken along the line IB-IB in FIG.

FIG. 1A is a schematic perspective view of a liquid crystal device 1, which serves as an electric field driving device, and FIG. 1B is a cross-sectional view that is taken along the line IB-IB in FIG. 1A. The liquid crystal device 1 includes an element substrate 10a and an opposite substrate 20a, which are opposed and adhered to each other through a frame-shaped seal material 52. The element substrate 10a includes a glass substrate 10 as a substrate, and the opposite substrate 20a includes a glass substrate 20. A liquid crystal 50 having a positive anisotropy of dielectric constant is sealed in a space surrounded by the element substrate 10a, the opposite substrate 20a and the seal material 52. The element substrate 10a is larger than the opposite substrate 20a, and is adhered to the opposite substrate 20a in a state where part of the element substrate 10a extends beyond the outer periphery of the opposite substrate 20a. A driver IC 51 that drives the liquid crystal 50 is mounted on the above extended portion. The liquid crystal 50 corresponds to a "material that is driven by an electric field that is generated by a difference in electric potential between the pixel electrodes and the common electrode."

A large number of sub-pixels 4 (see FIG. 2) that contribute to image display are arranged in a matrix in a region in which the liquid crystal 50 is sealed. Hereinafter, the region that is collectively formed of the sub-pixels 4 is termed as a pixel region 5.

Figure 2:
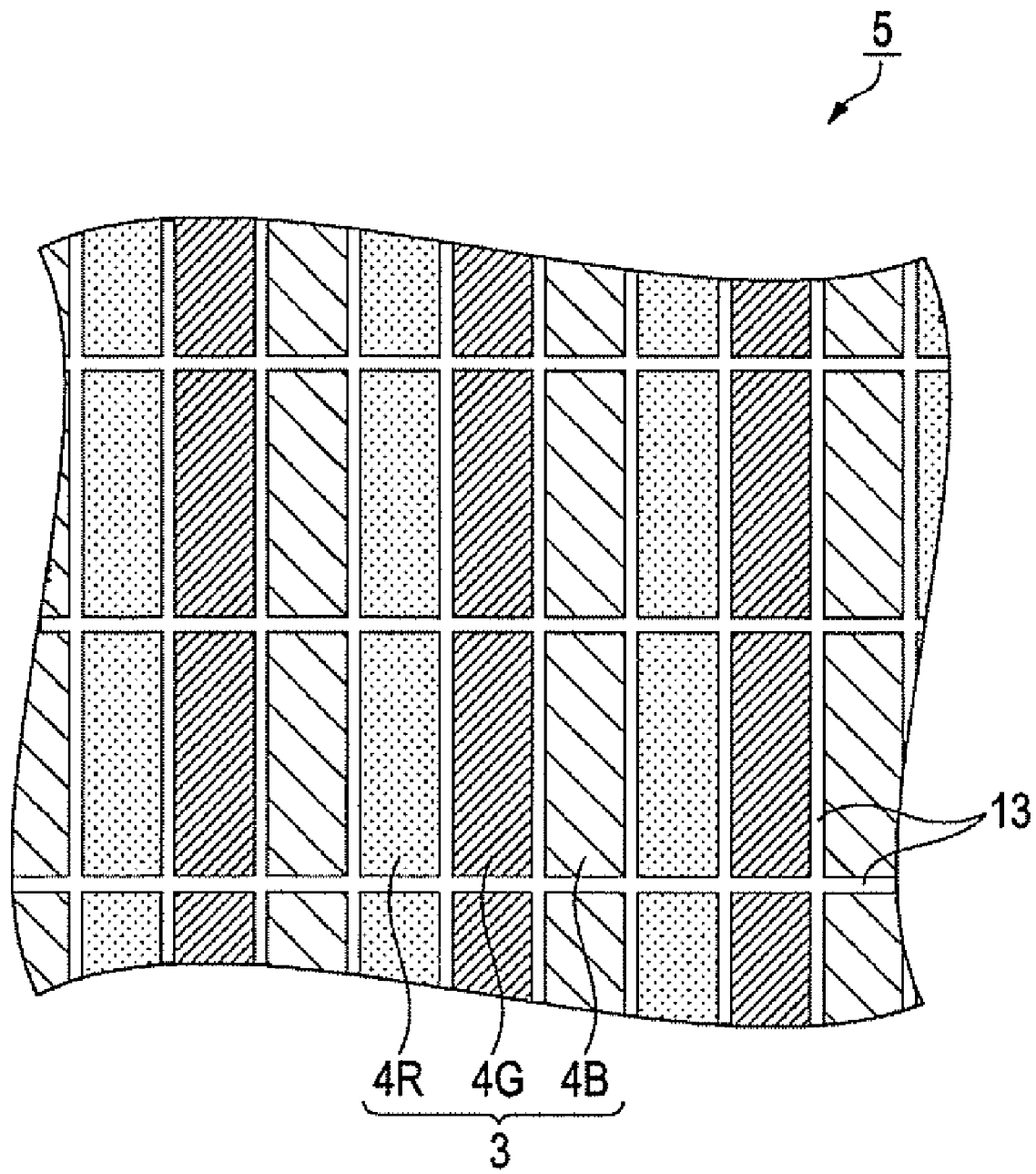
FIG. 2 is an enlarged plan view of a pixel region.

FIG. 2 is an enlarged plan view of the pixel region 5. A large number of the rectangular sub-pixels 4 are arranged in the pixel region 5. Each of the sub-pixels 4 contributes to color display of one of red, green and blue. Hereinafter, the sub-pixels that display red, green and blue colors are particularly termed as sub-pixels 4R, 4G, 4B, respectively. In FIG. 1B, a light shielding layer 13 and color filters (not shown) are formed on the surface, adjacent to the liquid crystal 50, of the glass substrate 20 that constitutes the opposite substrate 20a. The light shielding layer 13 is formed between any adjacent sub-pixels 4. The color filters are formed of resin that is able to color the transmitted light by absorbing a specific wavelength component of incident light. The red, green and blue color filters are arranged in the sub-pixels 4R, 4G, 4B, respectively. Hereinafter, even when any one of the sub-pixels 4R, 4G, 4B is specified, a sub-pixel may be simply termed as "sub-pixel 4" when it is not necessary to specify the corresponding color.

The sub-pixels 4 are arranged in a matrix. Hereinafter, the directions that define the matrix of the sub-pixels 4, that is, two orthogonal directions in which the adjacent sub-pixels 4 are arranged are termed as row direction and column direction. The sub-pixels 4 that are arranged in a certain column all have the same color. In other words, the sub-pixels 4 are arranged so that the corresponding colors are aligned in a stripe. In addition, each pixel 3 is formed of a set of three adjacent sub-pixels 4R, 4G, 4B that are aligned in the row direction. The pixel 3 is a minimum unit (pixel) of display. The liquid crystal device 1 is able to display various colors by adjusting the balance of luminance of the sub-pixels 4R, 4G, 4B in each pixel 3.

Figure 3:
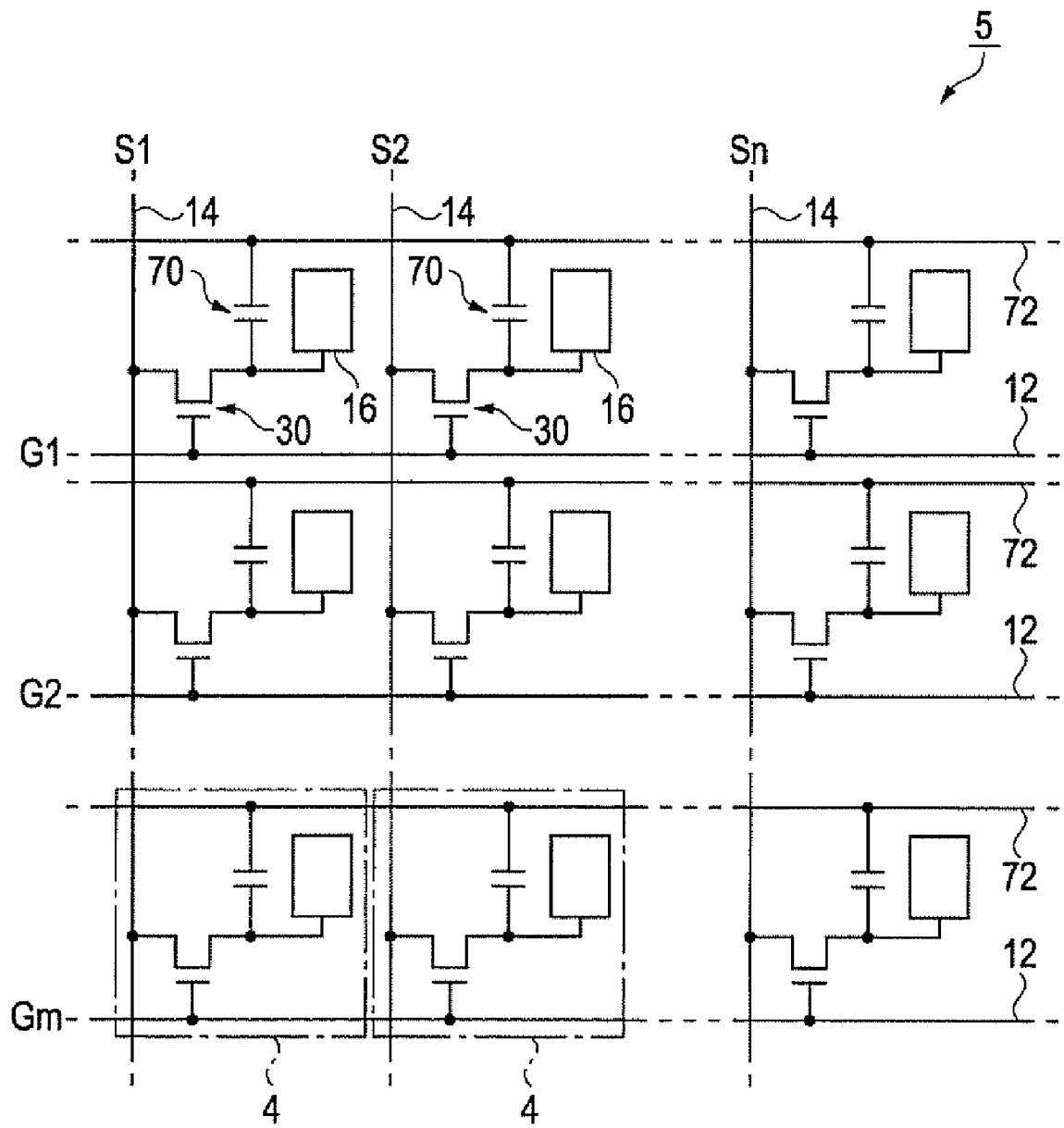
FIG. 3 is an equivalent circuit diagram of various elements, wirings, and the like, provided in a plurality of sub-pixels that constitute the pixel region.

FIG. 3 is an equivalent circuit diagram of various elements, wirings, and the like, provided in the plurality of sub-pixels 4 that constitute the pixel region 5. In the pixel region 5, a plurality of scanning lines 12 and a plurality of signal lines 14 are wired so as to intersect with one another, and pixel electrodes 16 are arranged in a matrix in regions that are defined by the scanning lines 12 and the signal lines 14. Then, a TFT (Thin Film Transistor) 30 is arranged for each of the sub-pixels 4 in proximity to a position of intersection of the corresponding scanning line 12 and the corresponding signal line 14. In addition, the pixel electrode 16 is electrically connected to the drain region of each TFT 30.

The TFTs 30 turn on by ON signals included in scanning signals G1, G2, ..., Gm supplied from the scanning lines 12, and, at this time, supply the corresponding pixel electrodes 16 with image signals S1, S2, ..., Sn supplied to the signal lines 14. Then, as an electric field corresponding to a voltage applied between the pixel electrode 16 and the common electrode 26 (see FIG. 4 and FIG. 5) is applied to the liquid crystal 50, the alignment state of the liquid crystal 50 changes. The liquid crystal device 1 performs displaying by modulating transmitted light using a polarization conversion function based on the alignment state of the liquid crystal 50 and a polarization selection function of a polarizer (not shown) arranged on the outer side of the liquid crystal device 1.

A storage capacitor 70 is electrically connected to the drain region of each TFT 30 in parallel with the corresponding pixel electrode 16. Each of the storage capacitors 70 is electrically connected to a capacitor line 72 that is set to a constant electric potential. By means of the storage capacitors 70, the voltages of the pixel electrodes 16 are maintained over a period of time that is, for example, three digits longer than a period of time during which a source voltage is applied. When the voltage holding characteristic is thus improved, the contrast ratio of display is improved. The above various elements, wirings, and the like, are formed mainly on the element substrate 10a.

Figure 4:
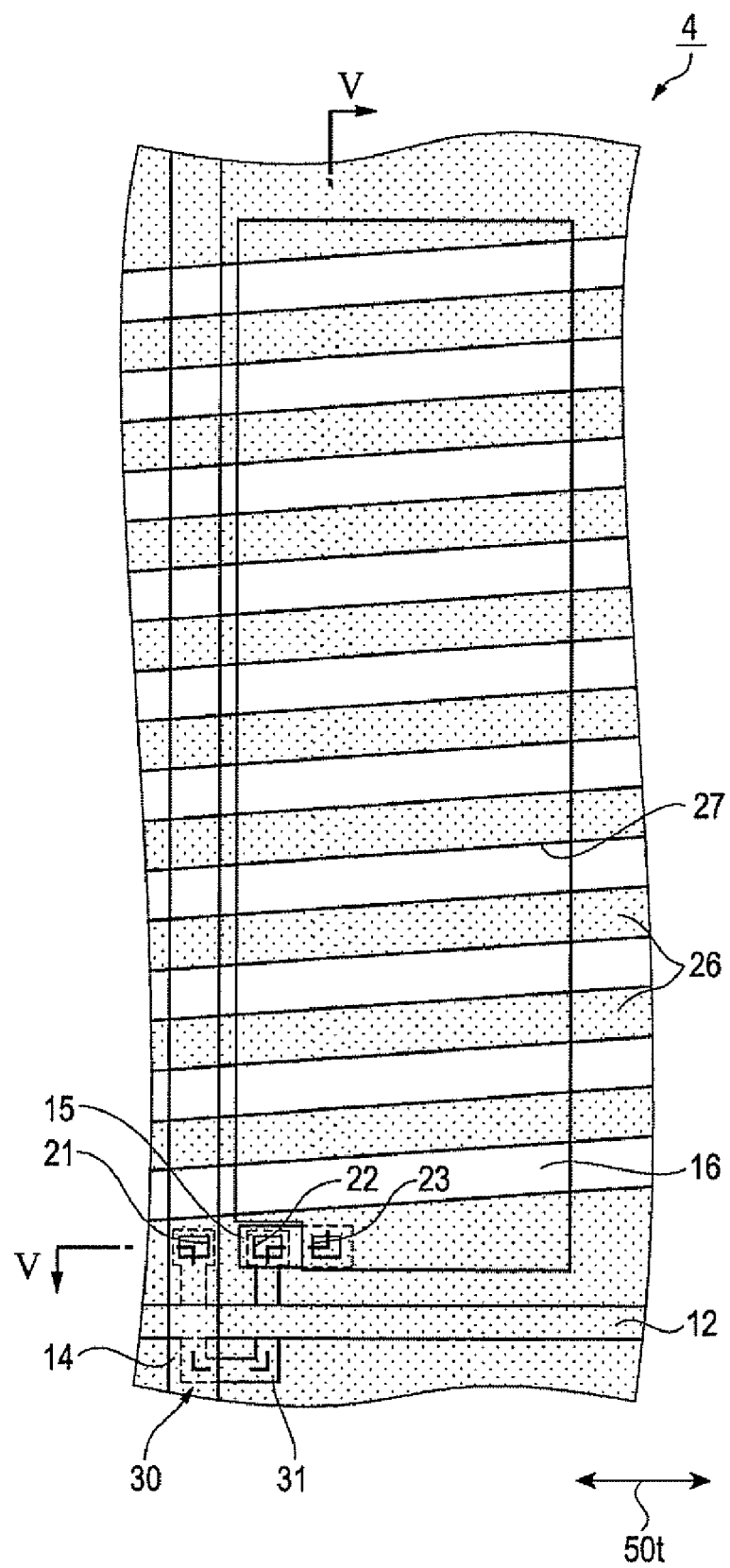
FIG. 4 is a plan view that specifically shows a portion corresponding to one sub-pixel formed in an element substrate.
Figure 5:
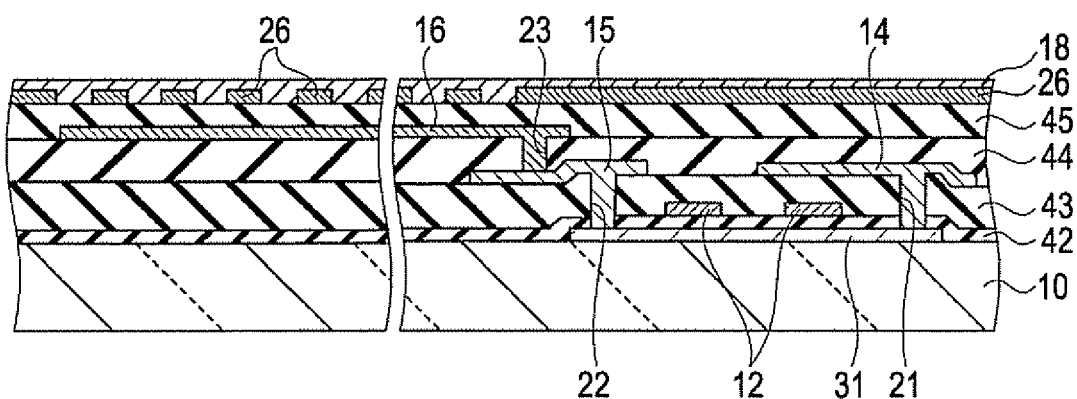
FIG. 5 is a cross-sectional view that is taken along the line V-V in FIG.

Next, components of each sub-pixel 4 will be described with reference to FIG. 4 and FIG. 5. FIG. 4 is a plan view that specifically shows a portion corresponding to one sub-pixel 4 formed in the element substrate 10a. FIG. 5 is a cross-sectional view that is taken along the line V-V in FIG. 4. In the following description, "upper layer" or "lower layer" indicates a layer that is formed relatively on the upper side or on the lower side in FIG. 5.

As shown in FIG. 4, the scanning line 12 and the signal line 14 are arranged to intersect with each other in the sub-pixel 4, and the TFT 30 is formed at a position corresponding to the intersection. In addition, the substantially rectangular pixel electrode 16 is electrically connected to the TFT 30.

As shown in FIG. 5, a semiconductor layer 31 is laminated on the glass substrate 10. The semiconductor layer 31 may be, for example, formed of a polysilicon layer, and includes a channel region, in which a channel is formed by an electric field from the scanning line 12, and a source region and a drain region, which interpose the channel region therebetween. In addition, in order to further reduce a leakage current, the semiconductor layer 31 preferably has an LDD (lightly doped drain) structure in which a lightly doped region is partly provided in the source region and in the drain region. A base insulating film, a light shielding layer, or the like, may be further formed between the semiconductor layer 31 and the glass substrate 10.

In the upper layer formed on the semiconductor layer 31, the scanning line 12 formed of a high melting point metal, such as titanium, chromium, tungsten, tantalum, and molybdenum, or an alloy containing one of these metals is laminated via a gate insulating film 42 formed of silicon oxide, or the like. The scanning line 12 is arranged parallel to an alignment direction 50t (see FIG. 4) of liquid crystal molecules 50a (see FIG. 6), which will be described later. The TFT 30 is formed of the above semiconductor layer 31, the gate insulating film 42, and the scanning line 12. The semiconductor layer 31 according to the present embodiment has a U shape as viewed in the direction of normal to the glass substrate 10, and the scanning line 12 is formed in a direction that crosses the U-shaped portion of the semiconductor layer 31. Thus, the TFT 30 has a double gate structure in which the scanning line 12 and the semiconductor layer 31 are opposite each other at different positions.

In the upper layer formed on the scanning line 12, the signal line 14 is laminated via an interlayer insulating film 43 formed of silicon oxide, or the like. The signal line 14 is formed of metal, such as aluminum, chromium, and tungsten, or an alloy containing one of these metals, and has a light shielding property. The signal line 14 is, as shown in FIG. 4, arranged so as to be perpendicular to the scanning line 12, and is electrically connected to the semiconductor layer 31 at one of distal ends of the U-shaped portion. More specifically, the signal line 14 is electrically connected to the source region of the semiconductor layer 31 through a contact hole that is provided to extend through the gate insulating film 42 and the interlayer insulating film 43.

A relay electrode 15 formed of the same material as that of the signal line 14 is formed in the same layer as the signal line 14. The relay electrode 15 is electrically connected to the drain region of the semiconductor layer 31 through a contact hole 22 that is provided to extend through the gate insulating film 42 and the interlayer insulating film 43 at the other distal end of the U-shaped portion.

In the upper layer formed on the signal line 14 and the relay electrode 15, the pixel electrode 16 formed of translucent ITO (indium tin oxide) is laminated via an interlayer insulating film 44 formed of silicon oxide. The pixel electrode 16 is provided separately for each of the sub-pixels 4. The pixel electrode 16 is electrically connected to the relay electrode 15 through a contact hole 23 that is formed in the interlayer insulating film 44. Thus, the pixel electrode 16 is electrically connected to the drain region of the semiconductor layer 31 through the relay electrode 15.

In the upper layer formed on the pixel electrode 16, the translucent common electrode 26 formed of ITO is formed via an interlayer insulating film 45, which serves as an insulating layer and is formed of silicon oxide, or the like. The common electrode 26 is arranged in strip regions that are indicated by dots in FIG. 4. That is, the common electrode 26 is formed on the pixel electrode 16 so that at least part of the common electrode 26 overlaps the pixel electrode 16 in plan view. In addition, the interlayer insulating film 45 is formed between the pixel electrode 16 and the common electrode 26. Multiple number of slits 27 are provided for the common electrode 26 at a portion that overlaps the pixel electrode 16 in plan view, The slits 27 are parallel to one another and are arranged at constant intervals. In addition, each of the slits 27 extends in a direction that is inclined at approximately an angle of 5 degrees to the short side of the sub-pixel 4 (that is, to the row direction). Here, the pixel electrode 16, the common electrode 26 and the interlayer insulating film 45 held between the electrodes serve as the storage capacitor 70 shown in FIG. 3. In addition, the interlayer insulating film 45 corresponds to an insulating layer.

An alignment layer 18 formed of polyimide is laminated on the common electrode 26. The alignment layer 18 is a member that is in contact with the liquid crystal 50 (see FIG. 1B). By rubbing the alignment layer 18, it is possible to align the liquid crystal 50 along the direction of rubbing when no driving voltage is applied (that is, when no electric field is applied). In the following description and drawings, the alignment direction of the liquid crystal 50 when no electric field is applied is denoted as the alignment direction 50t. In the present embodiment, the rubbing direction is parallel to the direction of the short side of each sub-pixel 4 (row direction). Thus, the alignment direction 50t of the liquid crystal 50 is parallel to the scanning line 12. In addition, the alignment direction 50t of the liquid crystal 50 makes an angle of approximately 5 degrees with the direction in which the slits 27 extend (see FIG. 4). In this manner, as will be described later, it is possible to rotate the liquid crystal molecules 50a (see FIG. 6) in the same rotational direction when a driving voltage is applied between the pixel electrode 16 and the common electrode 26. Thus, it is possible to suppress generation of a domain due to ununiform rotational directions of the liquid crystal molecules 50a.

Note that the alignment direction 50t (that is, the rubbing direction) of the liquid crystal 50 may be made parallel to the signal line 14 (that is, parallel to the column direction). In this case, the alignment direction 50t makes an angle of approximately 85 degrees with the direction in which the slits 27 extend. Thus, by using the liquid crystal 50 that has a negative anisotropy of dielectric constant, the rotational angle of the liquid crystal molecules 50a may be set smaller than 45 degrees and, as a result, it is possible to stably drive the liquid crystal 50.

Figure 6:
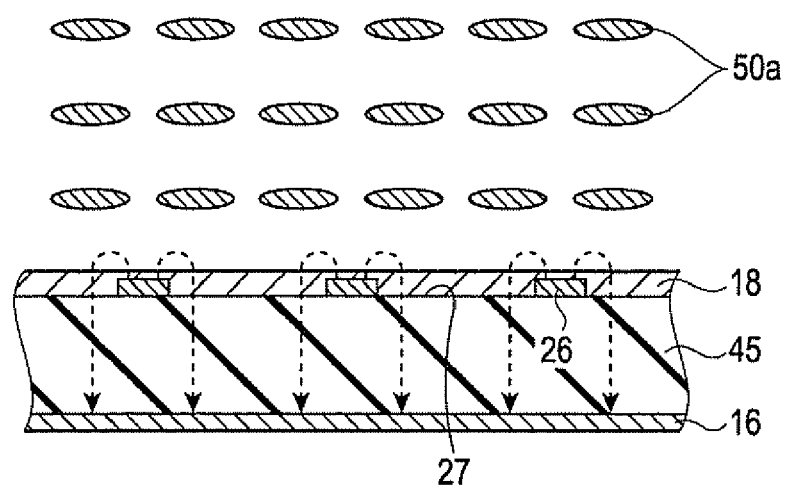
FIG. 6 is a schematic view that shows the state of an electric field that is generated when a driving voltage is applied between a common electrode and a pixel electrode.

FIG. 6 is a schematic view that shows the state of an electric field that is generated when a driving voltage is applied between the common electrode 26 and the pixel electrode 16 in the above described configuration. Wien the driving voltage is applied and a difference in electric potential is produced between the common electrode 26 and the pixel electrode 16, an electric field that has a line of electric force, extending from the upper face of the common electrode 26 through the slits 27 to the upper face of the pixel electrode 16, is generated. At this time, above the common electrode 26, that is, in the layer of the liquid crystal 50, an electric field that is parallel to the glass substrate 10 is generated. Then, the direction of the electric field (lateral electric field) is a direction that is perpendicular to the direction in which the slits 27 extend. The liquid crystal molecules 50a contained in the liquid crystal 50 change their alignment directions in a plane parallel to the glass substrate 10 on the basis of the magnitude of the lateral electric field. For example, the liquid crystal molecules 50a align in the direction of a lateral electric field, that is, in the direction that is perpendicular to the direction in which the slits 27 extend. As a result, the relative angle of the liquid crystal molecules 50a with respect to the polarization axes of polarizers (not shown) arranged respectively outside the element substrate 10a and the opposite substrate 20a change and, thereby, transmitted light is modulated on the basis of the polarization conversion function in accordance with the relative angle.

The above described liquid crystal mode is termed as an FFS mode. In the FFS mode, the liquid crystal molecules are always maintained in a substantially parallel relation to the glass substrate 10, so that it is possible to reduce a variation in retardation in accordance with a viewing angle and possible to perform displaying with a wide viewing angle.

Figure 7A:
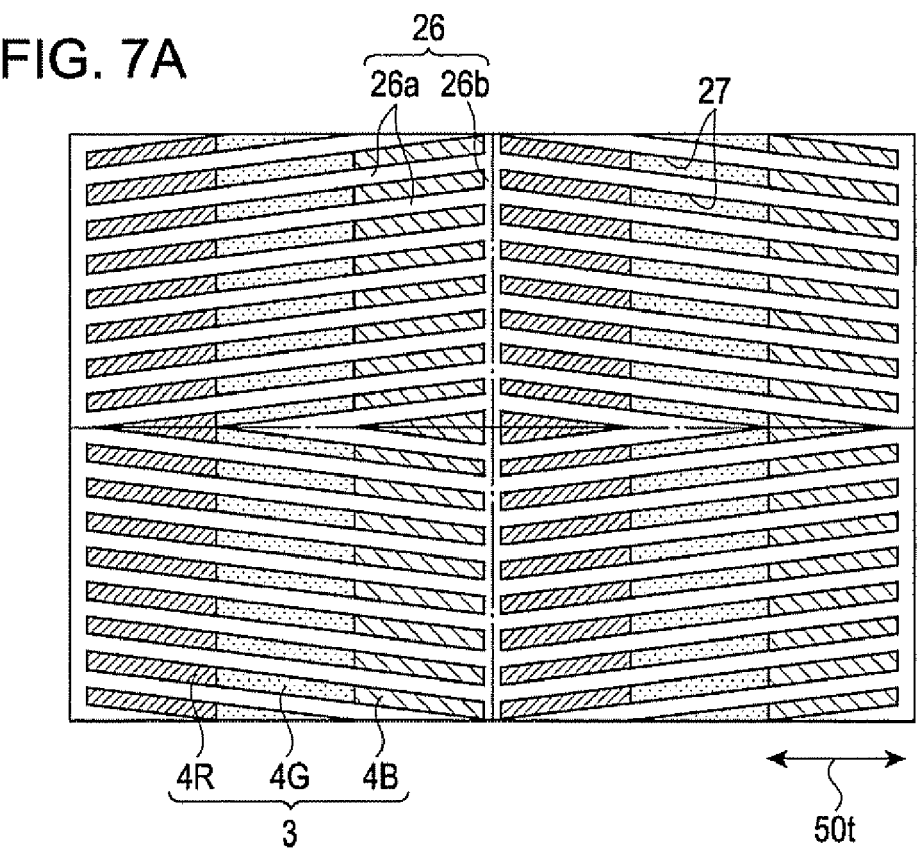
FIG. 7A and FIG. 7B are plan views that show the state of arrangement of the common electrode and slits in a region that includes four adjacent pixels.

FIG. 7A is a plan view that shows the state of arrangement of the common electrode 26 and slits 27 in a region that includes four adjacent pixels 3. The alternate long and short dash line used in the above drawing and in the following drawings indicates the boundary between the adjacent pixels 3. The pixel region 5 is formed so that a set of two by two pixels 3 shown in FIG. 7A serves as a minimum unit and is repeatedly arranged. As shown in the drawing, the slits 27 have continuous portions that continuously extend in a straight line over the plurality of sub-pixels 4 that are included in one pixel 3 and arranged adjacent to one another. In the present embodiment, the continuous portions extend over the entire pixel 3. In other words, the slits 27 extend continuously in a straight line over all the sub-pixels 4 included in each of the pixels 3. Thus, in the present embodiment, all of the slits 27 included in one pixel 3 correspond to any one of the continuous portions.

In addition, the extending direction of the slits 27 included in one pixel 3 is different from any one of the extending direction of the slits 27 included in the adjacent upper, lower, right or left pixel 3 to the one pixel 3. Specifically, the extending directions in which the slits 27 arranged in the adjacent pixels 3 extend are in symmetry with respect to the boundaries between the pixels 3. Therefore, when focusing on one of row or column of the pixels 3, the slits 27 having the same extending direction are repeatedly arranged every two pixels (that is, every other pixel). In addition, the alignment direction 50t of the liquid crystal 50, when no voltage is applied, is parallel to the short side of the sub-pixel 4. When focusing on two adjacent pixels 3 arranged on both sides of the short sides of the sub-pixels 4, the extending directions of the slits 27 that are arranged in these pixels 3 are in symmetry with respect to the alignment direction 50t.

The above description is made focusing on the arrangement of the slits 27; however, this also becomes the characteristic of arrangement of the common electrode 26. That is, the common electrode 26 is formed of strip portions 26a that are arranged symmetry with respect to the boundaries between the adjacent pixels 3 and connecting portions 26b that connect the strip portions 26a. The extending direction of the strip portions 26a included in one pixel 3 is different from the extending direction of the strip portions 26a included in the adjacent upper, lower, right or left pixel 3 to the one pixel 3. Specifically, the extending directions of the strip portions 26a arranged in the adjacent pixels 3 are in symmetry with respect to the boundaries between the pixels 3. Therefore, when focusing on one of row or column of the pixels 3, the strip portions 26a having the same extending direction are repeatedly arranged every two pixels (that is, every other pixel). In addition, the alignment direction Sot of the liquid crystal 50, when no voltage is applied, is parallel to the short side of the sub-pixel 4. When focusing on two adjacent pixels 3 arranged on both sides of the short sides of the sub-pixels 4, the extending directions of the strip portions 26a that are arranged in these pixels 3 are in symmetry with respect to the alignment direction 50t. The connecting portion 26b is arranged only at a portion of the outer periphery of each pixel 3, which includes the long side of the sub-pixel 4. Each of the slits 27 is formed in a region (opening portion) surrounded by the strip portions 26a and the connecting portions 26b.

According to the above described configuration, it is possible to differentiate the extending direction of the slits 27 (that is, the extending direction of the continuous portions) between the sub-pixels 4 corresponding to the same color. For example, the extending direction of the slits 27 is different between the sub-pixel 4R included in one pixel 3 and the sub-pixel 4R included in the pixel 3 arranged adjacent to the one pixel 3. Thus, it is possible to differentiate the direction of an electric field applied to the liquid crystal 50 between the adjacent sub-pixels 4 corresponding to the same color. As the direction of an electric field is different among the plurality of sub-pixels 4, the alignment direction of the liquid crystal molecules 50a changes depending on positions. Therefore, when viewed macroscopically, the amount of variation in apparent refractive index of the liquid crystal molecules 50a in accordance with a viewing angle is reduced. Thus, it is possible to reduce the viewing angle dependency of display color.

At this time, an angle that the alignment direction Sot of the liquid crystal 50, when no electric field is applied, makes with the extending direction of the slits 27 is the same among all the sub-pixels 4 and is approximately an angle of 5 degrees in the present embodiment. Thus, an angle that the alignment direction 50t makes with the direction of an electric field applied (lateral electric field) is the same among all the sub-pixels 4. Therefore, it is possible to produce a uniform change in alignment (rotation of the liquid crystal molecules 50a) of the liquid crystal 50 of each sub-pixel 4 while reducing the viewing angle dependency. Here, the uniform change in alignment means that the amount of rotation of the liquid crystal molecules 50a, when the same magnitude of electric field is applied, is the same.

In addition, the slits 27 include the continuous portions that extend continuously over the plurality of sub-pixels 4, so that, in comparison with the configuration in which the slits 27 are provided separately for each sub-pixel 4, it is possible to reduce the number of end portions of the slits 27 that disturb the alignment of the liquid crystal 50. In this manner, it is possible to reduce the area of a region in which the alignment of the liquid crystal 50 is disturbed and, hence, the display quality and transmittance ratio of the liquid crystal device 1 may be improved.

Figure 7B:
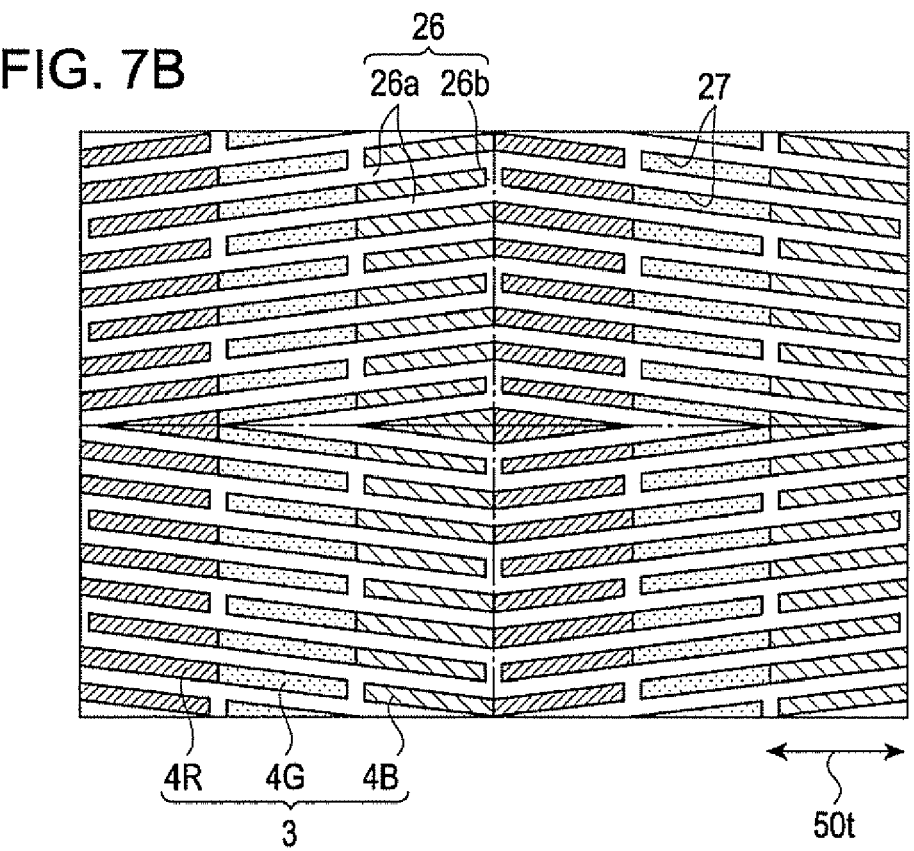

In place of the above configuration, the common electrode 26 and the slits 27 may be arranged as shown in FIG. 7B. In this drawing, the connecting portions 26b of the common electrode 26 are formed not only at a portion of the outer periphery of the pixel 3 but also at a portion of the outer periphery of each sub-pixel 4. More specifically, the end portions of the slits 27 arranged adjacent to each other in the vertical direction are deviated by an amount of width of the sub-pixel 4. According to the above configuration, a disturbance of an electric field at the end portions of the slits 27 uniformly influences all the sub-pixels 4R, 4G, 4B. Thus, it is possible to prevent a decrease in display quality due to display chrominance non-uniformity, roughness, or the like. In addition, with the above configuration as well, because the slits 27 have continuous portions in each of the pixels 3, it is possible to reduce the area of a region in which the alignment of the liquid crystal 50 is disturbed. Note that when the resistance of the common electrode 26 is sufficiently low, or the like, it may be configured so that no connecting portion 26b is provided. According to the above configuration, it is possible to further reduce a disturbance of the alignment of the liquid crystal 50.

Second Embodiment

Next, a second embodiment will be described. The liquid crystal device 1 according to the present embodiment differs from that of the first embodiment in that the number of sub-pixels 4 included in each of the pixels 3 and the arrangement of the slits 27 are modified, and the other portions are the same as those of the first embodiment. In the drawings used in the following description, the same reference numerals are assigned to the same components as those of the first embodiment, and the description thereof is omitted.

Figure 8A:
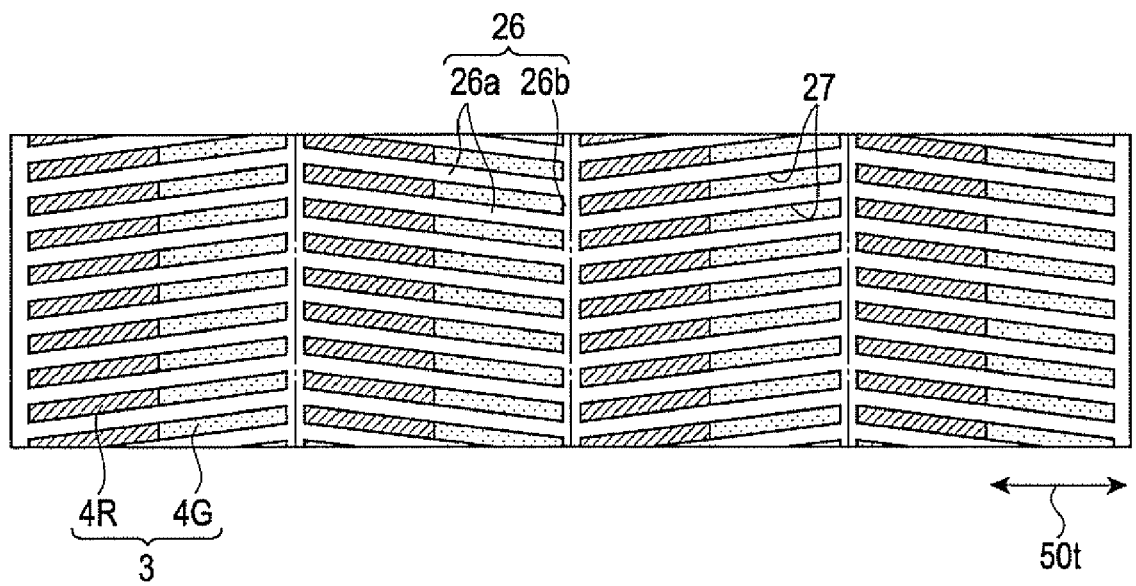
FIG. 8A and FIG. 8B are enlarged plan views that show the state of arrangement of a common electrode and slits in a liquid crystal device according to a second embodiment.

FIG. 8A is an enlarged plan view that shows the state of arrangement of the common electrode 26 and the slits 27 in the liquid crystal device 1 according to the second embodiment. In the drawing, four pixels 3 that are arranged adjacent to one another in a line are shown. In the present embodiment, each of the pixels 3 is formed of two sub-pixels 4R, 4G. Then, the slits 27 are arranged in the same manner as that shown in FIG. 7A. That is, the slits 27 each make an angle of approximately 5 degrees with the alignment direction 50t of the liquid crystal 50 and have continuous portions that extend continuously in a straight line over the plurality of sub-pixels 4. In the present embodiment as well, the continuous portions extend over the entire pixel 3. In other words, the slits 27 extend continuously in a straight line over all the sub-pixels 4 included in each of the pixels 3. In addition, the extending directions of the slits 27 (continuous portions) of the adjacent pixels 3 are different from each other, and, more specifically, are in symmetry with respect to the boundaries between the pixels 3 and the alignment direction 50t of the liquid crystal 50.

When focusing on the strip portions 26a and the connecting portions 26b that form the common electrode 26, the strip portions 26a each make an angle of approximately 5 degrees with the alignment direction 50t of the liquid crystal 50 and extend continuously in a straight line over the plurality of sub-pixels 4. Specifically, the strip portions 26a extend continuously in a straight line over all the sub-pixels 4 included in each of the pixels 3. In addition, the extending directions of the strip portions 26a in the adjacent pixels 3 are different from each other and, more specifically, are in symmetry with respect to the boundaries between the pixels 3 and the alignment direction 50t of the liquid crystal 50. The connecting portions 26b are arranged only at portions of the outer periphery of each pixel 3, which include the long sides of the sub-pixel 4.

According to the above configuration, because the extending direction of the slits 27 (that is, the extending direction of the continuous portions) is different among the pixels 3, even when sub-pixels 4 corresponding to even-numbered colors are repeatedly arranged in a line, it is possible to differentiate the direction of an electric field applied to the liquid crystal 50 among the sub-pixels 4 corresponding to the same color. Thus, it is possible to reduce the viewing angle dependency of display color. In addition, in each of the sub-pixels 4, it is possible to uniform an angle that the alignment direction 50t of the liquid crystal 50 makes with the direction of an electric field applied. Moreover, the slits 27 include the continuous portions and extend continuously over two sub-pixels 4, so that it is possible to reduce the number of end portions of the slits 27 that disturb the alignment of the liquid crystal 50 in each of the pixels 3. In this manner, it is possible to reduce the domain of the liquid crystal 50 and, hence, the display quality and transmittance ratio of the liquid crystal device 1 may be improved.

Figure 8B:
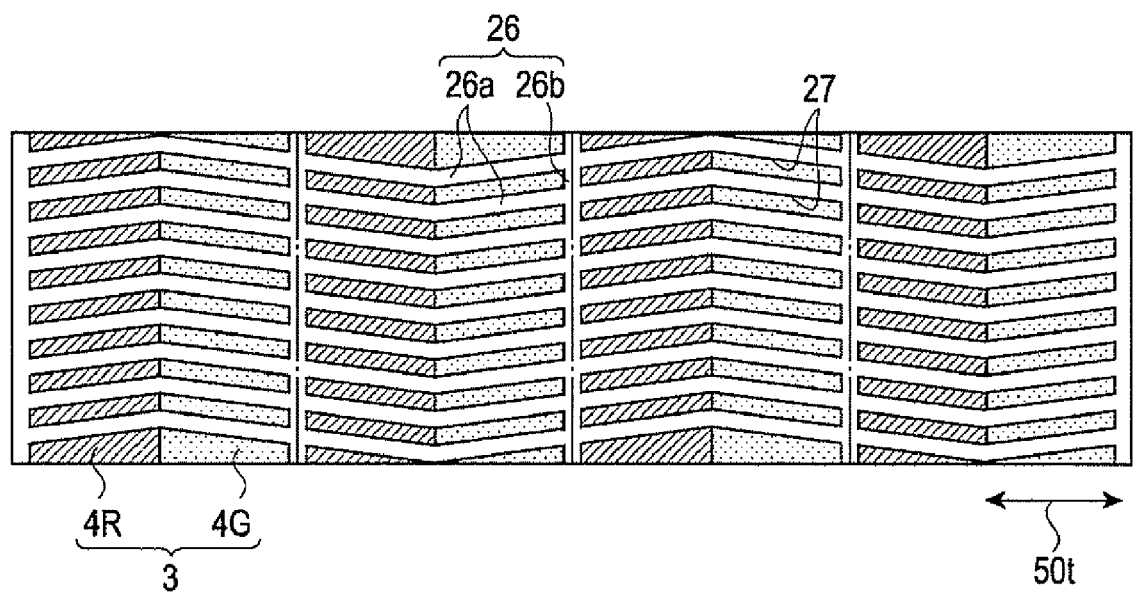

In place of the above configuration, the common electrode 26 and the slits 27 may be arranged as shown in FIG. 8B. In the drawing, the extending direction of the slits 27 and the extending direction of the strip portions 26a of the common electrode 26 are the same over the two adjacent sub-pixels 4 arranged on both sides of the boundary between the adjacent pixels 3, and the above extending directions are different between the sub-pixels 4R, 4G included in the same pixel 3. With the above configuration as well, it is possible to differentiate the direction of an electric field applied to the liquid crystal 50 between the sub-pixels 4 corresponding to the same color, and it is possible to reduce the viewing angle dependency of display color.

Third Embodiment

Next, a third embodiment will be described. The liquid crystal device 1 according to the present embodiment differs from that of the first embodiment in that the number of sub-pixels 4 included in each of the pixels 3 and the arrangement of the slits 27 are modified, and the other portions are the same as those of the first embodiment. In the drawings used in the following description, the same reference numerals are assigned to the same components as those of the first embodiment, and the description thereof is omitted.

Figure 9A:
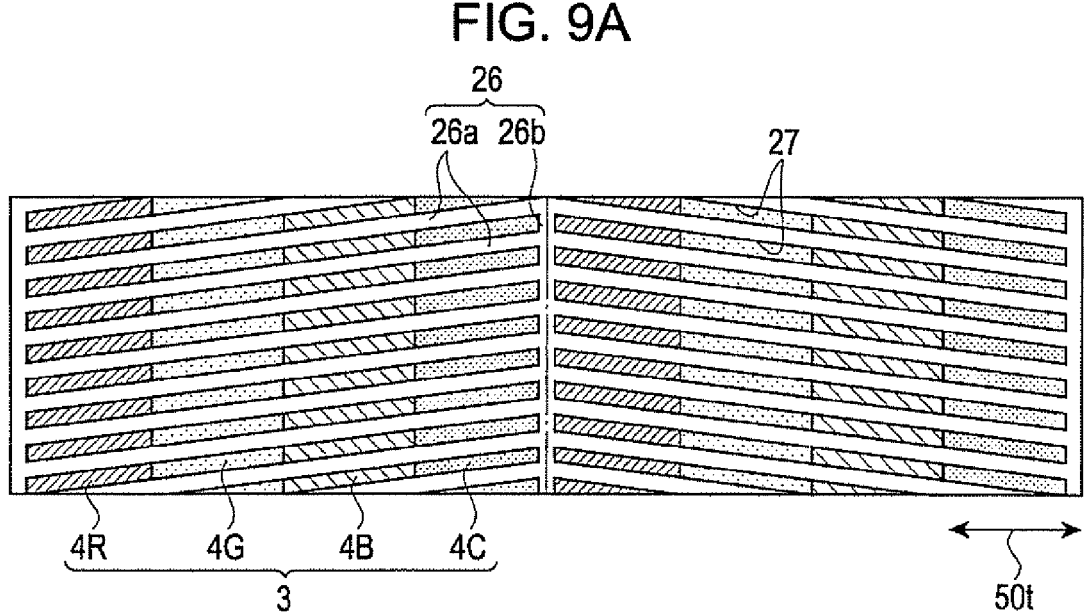
FIG. 9A and FIG. 9B are enlarged plan views that show the state of arrangement of a common electrode and slits in a liquid crystal device according to a third embodiment.

FIG. 9A is an enlarged plan view that shows the state of arrangement of the common electrode 26 and the slits 27 in the liquid crystal device 1 according to the third embodiment. In the drawing, two pixels 3 that are arranged adjacent to each other in a horizontal direction are shown. In the present embodiment, each of the pixels 3 is formed of four sub-pixels 4R, 4G, 4B, 4C, corresponding to red, green, blue, cyan, that are arranged in a line. Then, the slits 27 and the strip portions 26a of the common electrode 26 are arranged in the same manner as that shown in FIG. 7A. That is, the slits 27 and the strip portions 26a each make an angle of approximately 5 degrees with the alignment direction 50t of the liquid crystal 50 and have continuous portions that extend continuously in a straight line over the plurality of sub-pixels 4. In the present embodiment as well, the continuous portions extend over the entire pixel 3. In other words, the slits 27 and the strip portions 26a extend continuously in a straight line over all the sub-pixels 4 included in each of the pixels 3. In addition, the extending direction of the slits 27 (continuous portions) and strip portions 26a of the adjacent pixels 3 are different from each other, and, more specifically, are in symmetry with respect to the boundaries between the pixels 3 and the alignment direction 50t of the liquid crystal 50.

According to the above configuration, because the extending direction of the slits 27 (that is, the extending direction of the continuous portions) is different among the pixels 3, even when the sub-pixels 4 corresponding to even-numbered colors are repeatedly arranged in a line, it is possible to differentiate the direction of an electric field applied to the liquid crystal 50 between the sub-pixels 4 corresponding to the same color. Thus, it is possible to reduce the viewing angle dependency of display color. In addition, in each of the sub-pixels 4, it is possible to uniform an angle that the alignment direction Sot of the liquid crystal 50 makes with the direction of an electric field applied. Moreover, the slits 27 include the continuous portions and extend continuously over four sub-pixels 4, so that it is possible to reduce the number of end portions of the slits 27 that disturb the alignment of the liquid crystal 50 in each of the pixels 3. In this manner, it is possible to reduce the domain of the liquid crystal 50 and, hence, the display quality and transmittance ratio of the liquid crystal device 1 may be improved.

Figure 9B:
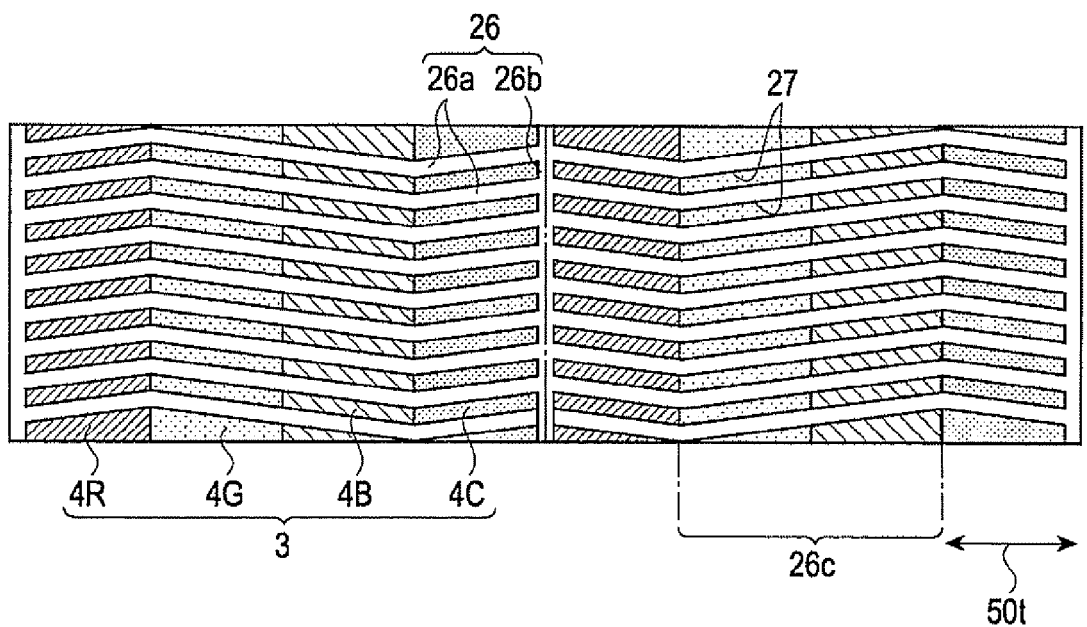

In place of the above configuration, the common electrode 26 and the slits 27 may be arranged as shown in FIG. 9B. In the drawing, the slits 27 and the strip portions 26a extend continuously in a straight line over two sub-pixels 4, excluding both ends of each pixel 3, that is, the sub-pixels 4G, 4B. In the configuration shown in the drawing, the portions of the slits 27 (a region indicated by the reference numeral 26c in the drawing) provided over the sub-pixels 4G, 4B correspond to the continuous portions. On the other hand, both the extending direction of the slits 27 and the extending direction of the strip portions 26a are different between the sub-pixels 4R, 4G, between the sub-pixels 4B, 4C, and between the adjacent two sub-pixels 4C, 4R arranged on both sides of the boundary between the adjacent pixels 3. According to the above configuration, the extending direction of the continuous portions of the slits 27 is different between the adjacent pixels 3, and the extending directions of the slits 27 arranged at portions other than the continuous portions, that is, in the sub-pixels 4R, 4C, are also different between the adjacent pixels 3. More specifically, the above extending directions all are in symmetry with respect to the boundaries between the pixels 3. In this manner, it is possible to differentiate the direction of an electric field applied to the liquid crystal 50 between the sub-pixels 4 corresponding to the same color, and it is possible to reduce the viewing angle dependency of display color.

Fourth Embodiment

Next, a fourth embodiment will be described. The liquid crystal device 1 according to the present embodiment differs from that of the first embodiment in that the shape of the pixels 3 is modified, and the other portions are the same as those of the first embodiment. In the drawings used in the following description, the same reference numerals are assigned to the same components as those of the first embodiment, and the description thereof is omitted.

Figure 10:
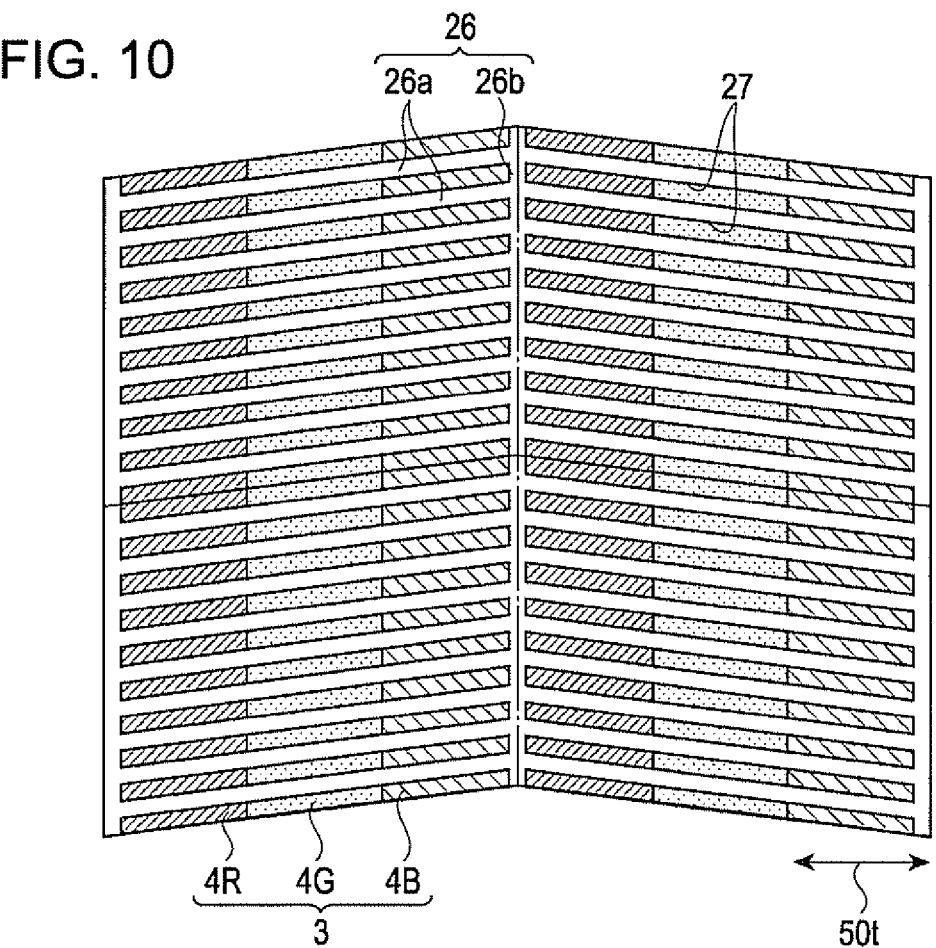
FIG. 10 is an enlarged plan view that shows the shape of pixels and the state of arrangement of a common electrode and slits in a liquid crystal device according to a fourth embodiment.

FIG. 10 is an enlarged plan view that shows the shape of the pixels 3 and the state of arrangement of the common electrode 26 and slits 27 in the liquid crystal device 1 according to the fourth embodiment. In the drawing, four pixels 3 that are arranged two by two are shown. In the present embodiment, each of the pixels 3 is formed in a parallelogram. Specifically, the adjacent pixels 3 arranged on both sides of one side that includes the long side of the sub-pixel 4 are formed in parallelograms that are in symmetry with respect to the one side, and the adjacent pixels 3 arranged on both sides of another side that includes the short side of the sub-pixel 4 are formed in parallelograms that are congruent with each other. Then, the slits 27 and the strip portions 26a of the common electrode 26 are formed so as to be parallel to the side, among the sides of the parallelogram, that includes the short side of the sub-pixel 4, and the slits 27 and the strip portions 26a include continuous portions that extend continuously in a straight line over the entire pixel 3. Here, the alignment direction S0t of the liquid crystal 50 is perpendicular to the long side of the sub-pixel 4. The alignment direction 50t makes an angle of approximately 5 degrees with both the extending direction of the slits 27 and the extending direction of the strip portions 26a (that is, the direction of the short side of the sub-pixel 4).

According to the above described configuration, because two sides of the outer periphery of each pixel 3 are parallel to the slits 27, in comparison with the case where the two sides are not parallel to the slits 27, it is possible to reduce the area of a region in which an electric field is disturbed in each of the pixels 3. That is, in each of the pixels 3, it is possible to apply an electric field of which direction is further uniform. In addition, the slits 27 include the continuous portions that extend over three sub-pixels 4, it is possible to reduce the area of a region in which an electric field is disturbed. In this manner, it is possible to reduce the domain of the liquid crystal 50 and, hence, the display quality and transmittance ratio of the liquid crystal device 1 may be improved.

In addition, the extending direction of the slits 27 is different between the sub-pixels 4 corresponding to the same color, it is possible to differentiate the direction of an electric field applied to the liquid crystal 50 between the sub-pixels 4 corresponding to the same color. Thus, it is possible to reduce the viewing angle dependency of display color.

Fifth Embodiment

Next, a fifth embodiment will be described. The liquid crystal device 1 according to the present embodiment differs from that of the fourth embodiment in that the number of sub-pixels 4 included in each of the pixels 3 is modified to two, and the other portions are the same as those of the fourth embodiment.

Figure 11:
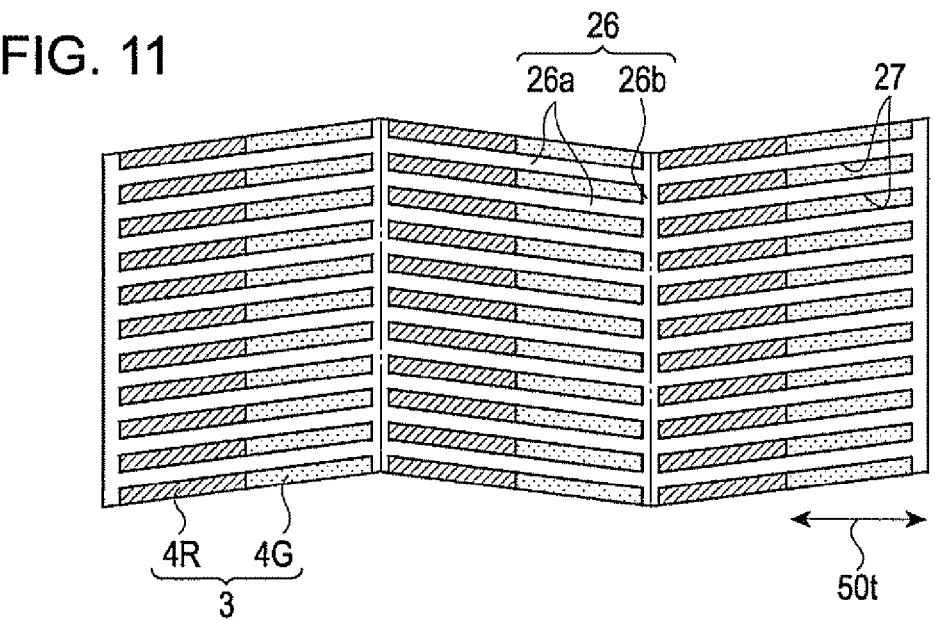
FIG. 11 is an enlarged plan view that shows the shape of pixels and the state of arrangement of a common electrode and slits in a liquid crystal device according to a fifth embodiment.

FIG. 11 is an enlarged plan view that shows the shape of the pixels 3 and the state of arrangement of the common electrode 26 and slits 27 in the liquid crystal device 1 according to the fifth embodiment. In the drawing, three pixels 3 that are adjacent to one another in a line are shown. In the present embodiment, each of the pixels 3 is formed of two sub-pixels 4R, 4G. The shape of the pixels 3 and the manner by which the slits 27 and the strip portions 26a of the common electrode 26 are arranged are the same as those shown in FIG. 10. That is, each of the pixels 3 is formed in a parallelogram, and the adjacent pixels 3 arranged on both sides of one side that includes the long side of the sub-pixel 4 are formed in parallelograms that are in symmetry with respect to the one side. Then, the slits 27 and the strip portions 26a are formed so as to be parallel to the side, among the sides of the parallelogram, that includes the short side of the sub-pixel 4, and the slits 27 and the strip portions 26a include continuous portions that extend in a straight line over the entire pixel 3. The alignment direction 50t of the liquid crystal 50 is perpendicular to the long side of the sub-pixel 4. In addition, the alignment direction 50t makes an angle of approximately 5 degrees with both the extending direction of the slits 27 and the extending direction of the strip portions 26a (that is, the direction of the short side of the sub-pixel 4).

According to the above described configuration, because two sides of the outer periphery of each pixel 3 are parallel to the slits 27, in comparison with the case where the two sides are not parallel to the slits 27, it is possible to reduce the area of a region in which an electric field is disturbed in each of the pixels 3. Furthermore, because the extending direction of the slits 27 is different between the pixels 3, even when the sub-pixels 4 corresponding to even-numbered colors are repeatedly arranged in a line, it is possible to differentiate the direction of an electric field applied to the liquid crystal 50 between the sub-pixels 4 corresponding to the same color. Thus, it is possible to reduce the viewing angle dependency of display color.

Sixth Embodiment

Next, a sixth embodiment will be described. The liquid crystal device 1 according to the present embodiment differs from that of the fifth embodiment in that the number of sub-pixels 4 included in each of the pixels 3 is modified to four, and the other portions are the same as those of the fifth embodiment.

FIG. 12A is an enlarged plan view that shows the shape of the pixels 3 and the state of arrangement of the common electrode 26 and slits 27 in the liquid crystal device 1 according to the sixth embodiment. In the drawing, two pixels 3 that are arranged adjacent to each other in a horizontal direction are shown. Each of the pixels 3 is formed of four sub-pixels 4R, 4G, 4B, 4C corresponding to red, green, blue, cyan that are arranged in a line. The shape of the pixels 3 and the manner by which the slits 27 and the strip portions 26a of the common electrode 26 are arranged are the same as those shown in FIG. 11. That is, each of the pixels 3 is formed in a parallelogram, and the adjacent pixels 3 arranged on both sides of one side that includes the long side of the sub-pixel 4 are formed in parallelograms that are in symmetry with respect to the one side. Then, the slits 27 and the strip portions 26a are formed so as to be parallel to the side, among the sides of the parallelogram, that includes the short side of the sub-pixel 4, and the slits 27 and the strip portions 26a include continuous portions that extend continuously in a straight line over the entire pixel 3. The alignment direction 50t of the liquid crystal 50 is perpendicular to the long side of the sub-pixel 4. In addition, the alignment direction 50t makes an angle of approximately 5 degrees with both the extending direction of the slits 27 and the extending direction of the strip portions 26a (that is, the direction of the short side of the sub-pixel 4).

According to the above described configuration, because two sides of the outer periphery of each pixel 3 are parallel to the slits 27, in comparison with the case where the two sides are not parallel to the slits 27, it is possible to reduce the area of a region in which an electric field is disturbed in each of the pixels 3. Furthermore, because the extending direction of the slits 27 is different between the pixels 3, even when the sub-pixels 4 corresponding to even-numbered colors are repeatedly arranged in a line, it is possible to differentiate the direction of an electric field applied to the liquid crystal 50 between the sub-pixels 4 corresponding to the same color. Thus, it is possible to reduce the viewing angle dependency of display color.

In place of the above configuration, the common electrode 26 and the slits 27 may be arranged as shown in FIG. 122B. In the drawing, four pixels 3 that are arranged adjacent to one another in a horizontal direction are shown. Here, four sub-pixels 4 that are included in each of the pixels 3 are arranged in a two-by-two matrix. That is, the sub-pixel 4R is arranged at the upper left of each pixel 3, the sub-pixel 4G is arranged at the upper right of each pixel 3, the sub-pixel 413 is arranged at the lower left of each pixel 3, and the sub-pixel 4C is arranged at the lower right of each pixel 3. According to the above configuration, in comparison with the arrangement shown in FIG. 12A, it is possible to reduce the pitch at which the pixels 3 are arranged in the horizontal direction of the drawing, that is, the extending direction of the slits 27. In this manner, it is possible to reduce unevenness that appears on the upper side and lower side of each pixel 3 and, hence, the display quality of the liquid crystal device 1 may be improved.

Seventh Embodiment

Next, a seventh embodiment will be described. The present embodiment differs from the first embodiment in that the arrangement of the slits 27 and the alignment direction 50t of the liquid crystal 50 are modified, and the other portions are the same as those of the first embodiment.

Figure 13A:
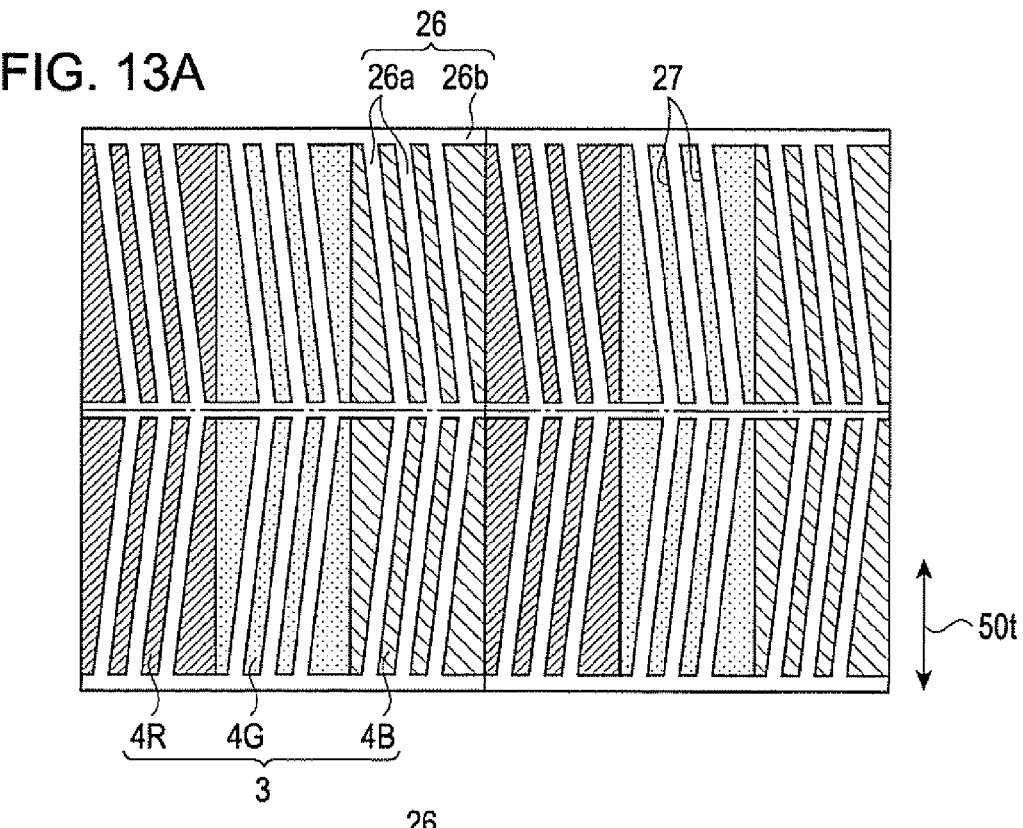
FIG. 13A and FIG. 13B are enlarged plan views that show the shape of pixels and the state of arrangement of a common electrode and slits in a liquid crystal device according to a seventh embodiment.
Figure 13B:
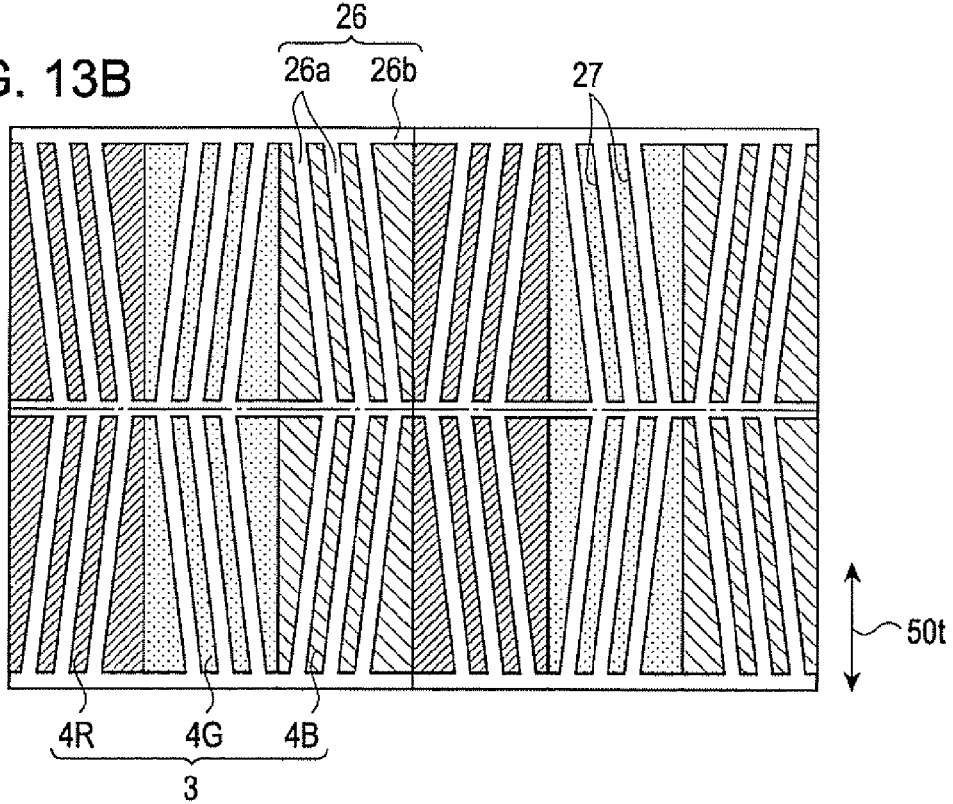
Figure 14:
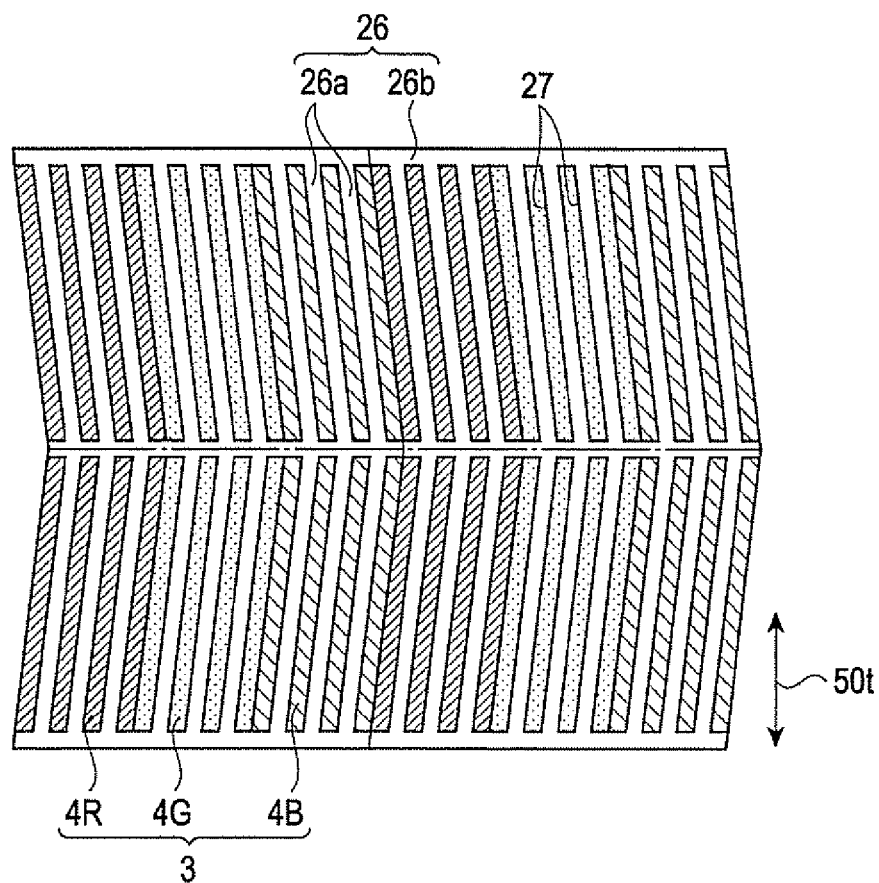
FIG. 14 is an enlarged plan view that shows the shape of the pixels and the state of arrangement of the common electrode and slits in the liquid crystal device according to the seventh embodiment.

FIG. 13A, FIG. 13B and FIG. 14 are enlarged plan views that show the shape of the pixels 3 and the state of arrangement of the common electrode 26 and slits 27 in the liquid crystal device 1 according to the seventh embodiment. In these drawings, four pixels 3 that are arranged two by two are shown. Here, each of the pixels 3 is formed of three-color sub-pixels 4R, 4G, 4B.

In FIG. 13A and FIG. 13B, the slits 27 and strip portions 26a of the common electrode 26 are provided so as to make an angle of approximately 5 degrees with the long side of the sub-pixel 4. In addition, the alignment direction 50t of the liquid crystal 50 is parallel to the long side of the sub-pixel 4. Thus, an angle that the slits 27 and the strip portions 26a make with the alignment direction 50t of the liquid crystal 50 is approximately 5 degrees.

In FIG. 13A, the slits 27 and the strip portions 26a, which are included in the adjacent pixels 3, are arranged in symmetry with respect to one side of the outer periphery of the pixel 3, which includes the short side of the sub-pixel 4. In addition, the slits 27 and the strip portions 26a are arranged parallel to one another in each of the pixels 3.

In FIG. 13B, the slits 27 and the strip portions 26a, which are included in each of the pixels 3, are arranged in symmetry with respect to one side of the outer periphery of the pixel 3, which includes the short side of the sub-pixel 4, as in the case shown in FIG. 13A. Moreover, the slits 27 and the strip portions 26a, which are arranged in each of the sub-pixels 4, are arranged in symmetry with respect to the long sides of the adjacent sub-pixels 4.

In FIG. 14, each of the pixels 3 is formed in a parallelogram, and the adjacent pixels 3 arranged on both sides of one side that includes the short side of the sub-pixel 4 are formed in parallelograms that are in symmetry with respect to the one side. Then, the slits 27 and the strip portions 26a are formed so as to be parallel to the side, among the sides of the parallelogram, that includes the long side of the sub-pixel 4. The alignment direction 50t of the liquid crystal 50 is perpendicular to the short side of the sub-pixel 4 and makes an angle of approximately 5 degrees with the long side of the sub-pixel 4. Thus, an angle that the slits 27 and the strip portions 26a make with the alignment direction 50t of the liquid crystal 50 is approximately 5 degrees.

According to the above described configuration shown in FIG. 13A, FIG. 13B and FIG. 14, both the extending direction of the slits 27 and the extending direction of the strip portions 26a are different between the sub-pixels 4 corresponding to the same color, it is possible to differentiate the direction of an electric field applied to the liquid crystal 50 between the sub-pixels 4 corresponding to the same color. Thus, it is possible to reduce the viewing angle dependency of display color.

Electronic Apparatus

Figure 16:
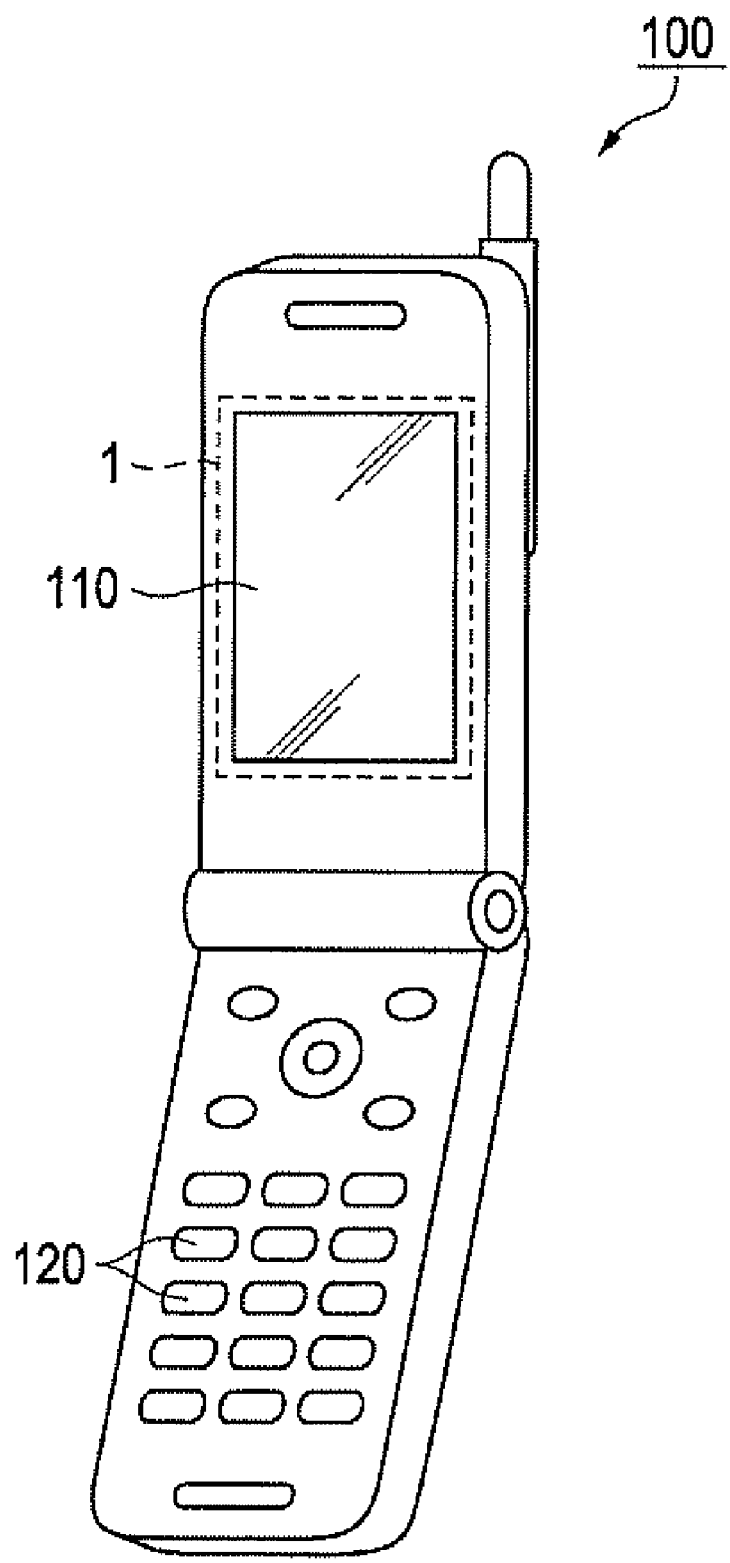
FIG. 16 is a perspective view of a cellular phone, which serves as an electronic apparatus.
Figure 17A:
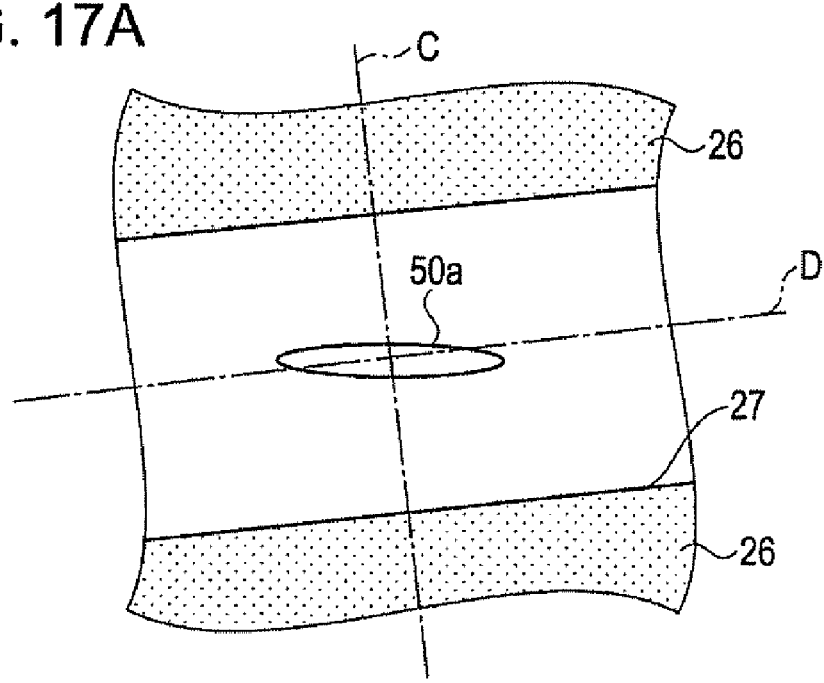
FIG. 17A is an enlarged plan view of an FFS mode liquid crystal device when no voltage is applied.
Figure 17B:
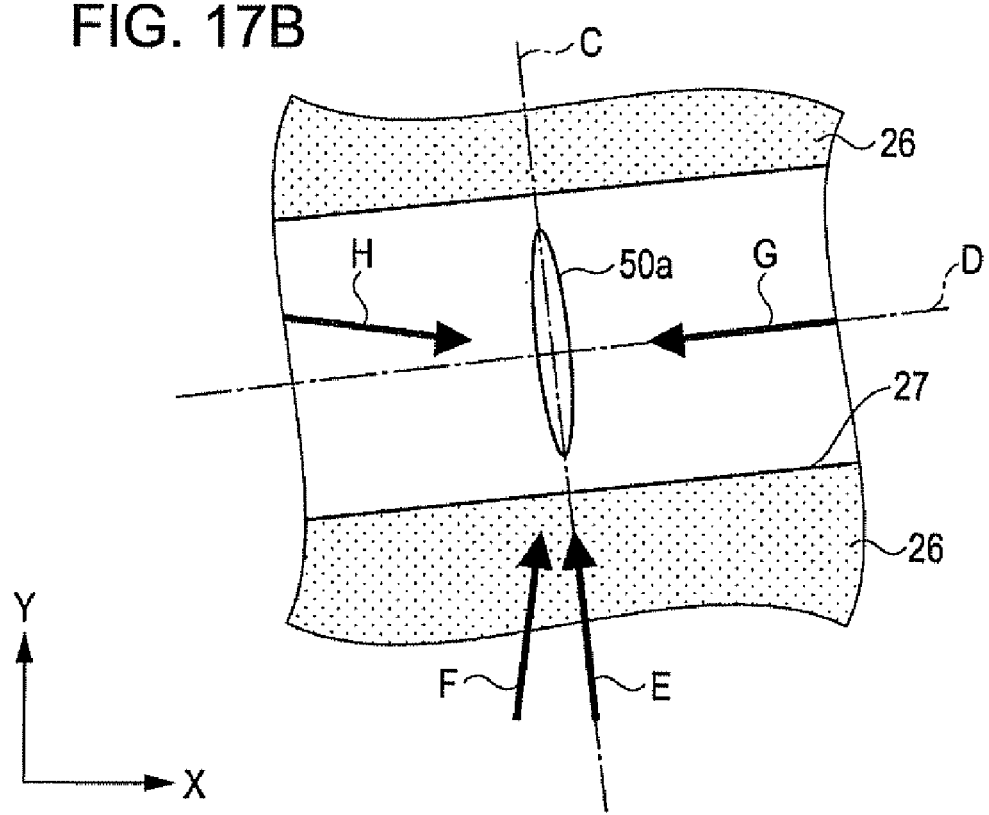
FIG. 17B is an enlarged plan view of the FFS mode liquid crystal device when a voltage is applied.
Figure 18:
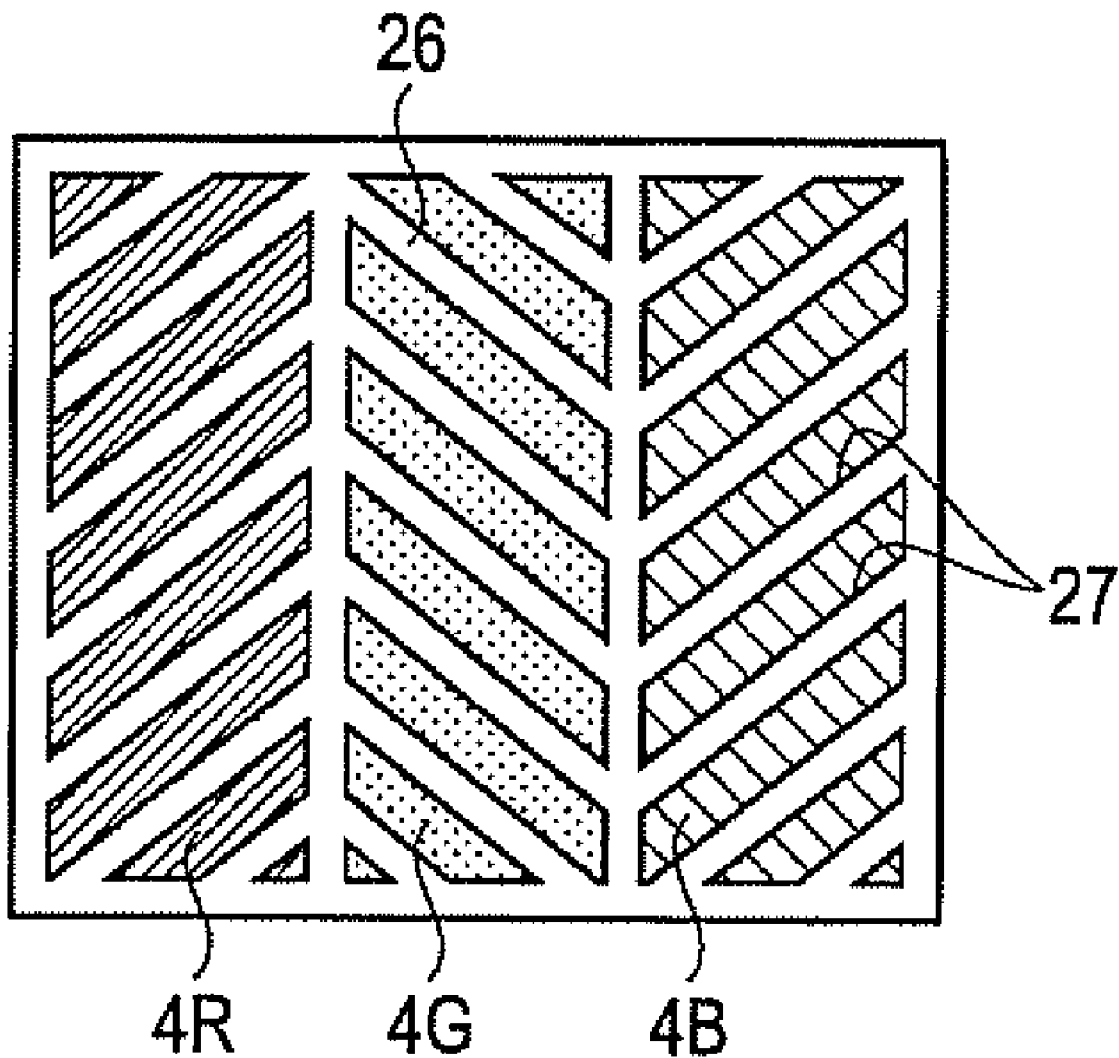
FIG. 18 is an enlarged plan view of a liquid crystal device according to the known art.

The above described liquid crystal device 1, which serves as an electric field driving device, may be, for example, used for a cellular phone 100, which serves as an electronic apparatus, shown in FIG. 16. The cellular phone 100 has a display portion 110 and operation buttons 120. The display portion 110 is able to perform high-quality display with reduced viewing angle dependency of display color in regard to various pieces of information, including data that are input by the operation buttons 120 and incoming information, by the built-in liquid crystal device 1.

Note that the liquid crystal device 1 may be used for various electronic apparatuses, such as a mobile computer, a digital camera, a digital video camera, an in-vehicle equipment, or an audio instrument, in addition to the above cellular phone 100.

The above described embodiments may be modified into various forms. For example, the following alternative embodiments are applicable.

First Alternative Embodiment

In the above embodiments, the configuration in which, in the column of the pixels 3, the slits 27 having the same extending direction are repeatedly arranged every two pixels (that is, every other pixel) is shown, but the aspects of the invention are not limited to it. For example, it may be configured so that the extending direction of the slits 27 (or the continuous portions included in the slits 27) is different among three adjacent pixels 3 that are arranged in a line, and the slits 27 (or the continuous portions) having the same extending direction are repeatedly arranged every three pixels. Alternatively, it may be configured so that the extending direction of the slits 27 (or the continuous portions) is different among n adjacent pixels 3 that are arranged in a line, and the slits 27 (or the continuous portions) having the same extending direction are repeatedly arranged every n pixels, According to the above described configuration, it is possible to variously change the direction of an electric field every pixel 3. Thus, it is possible to further reduce the viewing angle dependency.

Second Alternative Embodiment

In some of the above embodiments, the configuration in which the alignment direction 50t of the liquid crystal 50 is parallel to the boundary between the adjacent pixels 3 is provided; however, the alignment direction 50t is not necessarily parallel to the boundary but it may be inclined at a certain angle with respect to the boundary. In this case, the slits 27 included in the adjacent pixels 3 are arranged so that their extending directions are in symmetry with respect to the alignment direction 50t of the liquid crystal 50. With the above configuration as well, it is possible to reduce the viewing angle dependency of display color.

Third Alternative Embodiment

In some of the above embodiments, the configuration in which the connecting portions 26b of the common electrode 26 are arranged at the outer peripheries of the adjacent pixels 3 is provided, but the aspects of the invention are not limited to it. In any embodiments, it is possible to also arrange the connecting portions 26b partly at the outer periphery of each sub-pixel 4, as shown in FIG. 7B. According to the above configuration, a disturbance of an electric field at the end portions of the slits 27 uniformly influences all the sub-pixels 4R, 4G, 4B. Thus, it is possible to prevent a decrease in display quality due to display chrominance non-uniformity, roughness, or the like.

Fourth Alternative Embodiment

In some of the above embodiments, four-color sub-pixels 4 corresponding to red, green, blue and cyan are provided, but a combination of four colors may be changed. An example of another combination of four colors may be four colors of red, yellowish green, blue, and emerald green. Other than the above, it may be selected so that a combination of four colors consisting of a display of blue-based hue, a display of red-based hue, and displays of two kinds of hues selected from the hues ranging from blue to yellow, among a visible light region (380 to 780 nm) in which the hue varies on the basis of a wavelength. Here, the word "based" is used; for example, blue-based color is not limited to the hue of pure blue, but it also includes bluish purple, greenish blue, and the like. In addition, red-based hue is not limited to red, but it includes orange.

Fifth Alternative Embodiment

The sub-pixels 4 need not be an accurate rectangle or an accurate parallelogram. The shape of the sub-pixels 4 may be, for example, based on a rectangle or a parallelogram, formed so that one pair of two opposite sides among four sides are made non-parallel to each other to form a trapezoid, any one of the four sides is curved, one of four corners of the rectangle is cutout, or the like.

Sixth Alternative Embodiment

In the above embodiments, an angle that the alignment direction of the liquid crystal 50 make with the slits 27 (or the continuous portions included in the slit 27) is approximately 5 degrees, but the aspects of the invention are not limited to it. The angle may be selected where appropriate. For example, when the angle that the extending direction of the slits 27 (continuous portions) makes with the alignment direction 50t of the liquid crystal 50 is larger than 0 degree and smaller than 45 degrees, the liquid crystal 50 having a positive anisotropy of dielectric constant is used. When the angle that the extending direction of the slits 27 (continuous portions) makes with the alignment direction 50t of the liquid crystal 50 is larger than 45 degrees and smaller than 90 degrees, the liquid crystal 50 having a negative anisotropy of dielectric constant is used. In this manner, the rotational angle of the liquid crystal molecules 50a by an electric field may be set smaller than 45 degrees, so that it is possible to uniform the rotational directions of the liquid crystal molecules 50a. Thus, it is possible to suppress generation of a domain due to ununiform rotational directions of the liquid crystal molecules 50a.

Seventh Alternative Embodiment

In the above embodiments, the configuration in which the extending direction of the slits 27 (continuous portions) included in one pixel 3 is different from the extending directions of the slits 27 (continuous portions) included in the four adjacent upper, lower, right and left pixels 3 to the one pixel 3 is shown. Furthermore, the configuration in which the extending direction of the slits 27 (continuous portions) included in one pixel 3 is different from the extending directions of the slits 27 (continuous portions) included in the two adjacent upper and lower or right and left pixels 3 to the one pixel 3 is shown. However, the aspects of the invention are not limited to them. For example, it is applicable that the extending direction of the slits 27 (continuous portions) included in one pixel 3 is different from the extending direction of the slits 27 (continuous portions) included in at least one of the pixels 3 arranged adjacent to the one pixel 3. With the above configuration as well, it is possible to differentiate the direction of an electric field applied to the liquid crystal 50 between the sub-pixels 4 corresponding to the same color, and it is possible to reduce the viewing angle dependency of display color.

Eighth Alternative Embodiment

In the above embodiments, the liquid crystal device 1 is described as one example of the electric field driving device, but the aspects of the invention are not limited to it. It is only necessary that the electric field driving device drives a material by an electric field generated by a difference in electric potential (driving voltage) applied between the pixel electrode 16 and the common electrode 26; the electric field driving device is not limited to the liquid crystal device.

Ninth Alternative Embodiment

Figure 15:
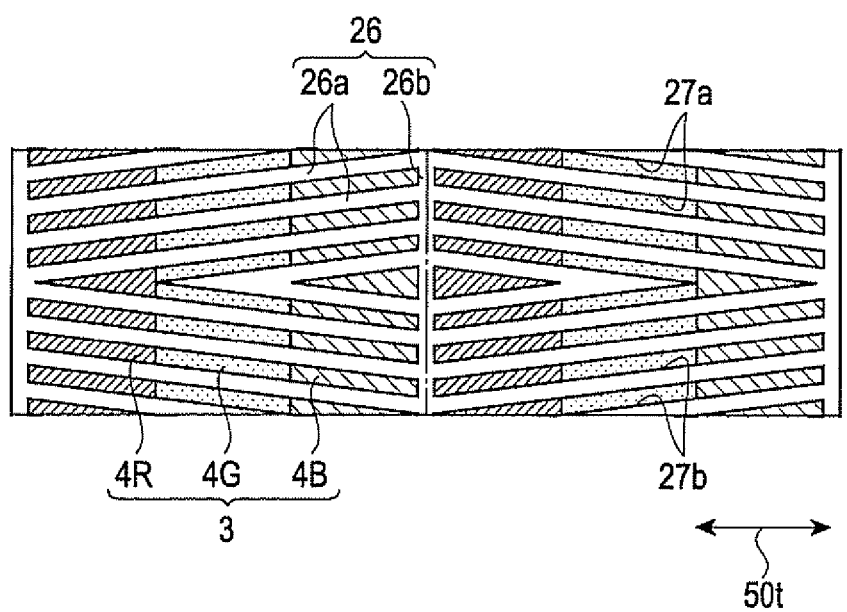
FIG. 15 is an enlarged plan view that shows the shape of pixels and the state of arrangement of a common electrode and slits in a liquid crystal device according to a ninth alternative embodiment.

The strip portions 26a or the slits 27 that form the common electrode 26 may be partly formed non-parallel to each other in the sub-pixel 4. FIG. 15 is an enlarged plan view that shows the shape of the pixels 3 and the state of arrangement of the common electrode 26 and slits 27 in the liquid crystal device 1 according to the ninth alternative embodiment. In each of the sub-pixels 4 included in the pixel 3, slits 27a and slits 27b are non-parallel to each other. According to the above described configuration as well, it is possible to differentiate the extending direction of the slits 27 (that is, the extending direction of the continuous portions) between the adjacent sub-pixels 4 corresponding to the same color. In this manner, it is possible to differentiate the direction of an electric field applied to the liquid crystal 50 between the sub-pixels 4 corresponding to the same color, and it is possible to reduce the viewing angle dependency of display color.

What is claimed is:

1. An electric field driving device in which a plurality of pixels, each of the plurality of pixels being formed of two or more sub-pixels that respectively correspond to different colors from one another, are arranged in a matrix in a pixel region on a substrate, comprising:

a plurality of pixel electrodes, each of the plurality of pixel electrodes being formed in correspondence with the sub-pixels on the substrate;

a common electrode that is formed above the plurality of pixel electrodes on the substrate so that at least part of the common electrode overlaps each of the plurality of pixel electrodes in plan view, and has a plurality of slits;

an insulating layer that is formed on the substrate between the plurality of pixel electrodes and the common electrode; and a material that is driven by an electric field that is generated on the basis of a difference in electric potential between each of the pixel electrodes and the common electrode, the plurality of slits at least partly overlap each of the plurality of pixel electrodes in plan view, at least a portion of the plurality of slits in each of the sub-pixels being parallel to one another and including a continuous portion that extends in a straight line over the plurality of sub-pixels that are included in one pixel of the pixels and arranged adjacent to one another, and an extending direction in which the continuous portion that is included in the one pixel extends and an extending direction in which the continuous portion that is included in at least one of the plurality of pixels arranged adjacent to the one pixel extends being different from each other.

2. The electric field driving device according to claim 1, the extending direction of the continuous portion that is included in the one pixel and the extending direction of the continuous portion that is included in the at least one of the pixels arranged adjacent to the one pixel being in symmetry with respect to a boundary between the pixels arranged adjacent to each other.

3. The electric field driving device according to claim 2, each of the pixels being formed in a parallelogram, and the plurality of slits being parallel to at least one of sides of the parallelogram.

4. The electric field driving device according to claim 2, the extending direction of the continuous portion being different among the n pixels that are arranged adjacent to one another in a line, and the continuous portions having the same extending direction being repeatedly arranged every n pixels in a line of the pixels, n being a positive number.

5. The electric field driving device according to claim 1, the continuous portion extending over the entire pixel.

6. An electronic apparatus comprising the electric field driving device according to claim 1 as a display portion.

7. An electronic apparatus according to claim 1, the electronic apparatus being at least one of a cellular phone, a mobile computer, a digital camera, a digital video camera, an in-vehicle equipment, a digital video camera, an in-vehicle equipment, and an audio instrument.

8. A liquid crystal device in which a plurality of pixels, each of the plurality of pixels being formed of two or more sub-pixels that respectively correspond to different colors from one another, are arranged in a matrix in a pixel region on a substrate, comprising:

a plurality of pixel electrodes, each of the plurality of pixel electrodes is formed in correspondence with the sub-pixels on the substrate;

a common electrode that is formed above each of the plurality of pixel electrodes on the substrate so that at least part of the common electrode overlaps each of the plurality of pixel electrodes in plan view, and has a plurality of slits;

an insulating layer that is formed on the substrate between the plurality of pixel electrodes and the common electrode; and a liquid crystal that is driven by an electric field that is generated on the basis of a difference in electric potential between each of the pixel electrodes and the common electrode, the plurality of slits at least partly overlapping each of the plurality of pixel electrodes in plan view, at least a portion of the plurality of slits being parallel to one another in each of the sub-pixels and including a continuous portion that extends in a straight line over the plurality of sub-pixels that are included in one pixel of the plurality of pixels and arranged adjacent to one another, and an extending direction in which the continuous portion that is included in the one pixel extends and an extending direction in which the continuous portion that is included in at least one of the pixels arranged adjacent to the one pixel extends being different from each other, and being in symmetry with respect to an alignment direction of the liquid crystal when the electric field is not applied.

9. The liquid crystal device according to claim 8, an angle that the extending direction of the continuous portion makes with the alignment direction being larger than 0 degree and smaller than 45 degrees, and the liquid crystal having a positive anisotropy of dielectric constant.

10. The liquid crystal device according to claim 8, an angle that the extending direction of the continuous portion makes with the alignment direction being larger than 45 degrees and smaller than 90 degrees, and the liquid crystal having a negative anisotropy of dielectric constant.

11. The liquid crystal device according to claim 8, further comprising:

a scanning line or scanning lines that are arranged parallel to the alignment direction.

12. The liquid crystal device according to claim 8, further comprising:

a signal line or signal lines that are arranged parallel to the alignment direction.

13. An electronic apparatus comprising the liquid crystal device according to claim 8 as a display portion.

14. An apparatus comprising:

a substrate;

a plurality of pixels formed on the substrate such that the plurality of pixels form a matrix, each of the plurality of pixels including a plurality of sub-pixels, the plurality of sub-pixels corresponding to a different color;

a plurality of pixel electrodes, each of the plurality of pixel electrodes being formed to correspond with the plurality of sub-pixels on the substrate;

at least one common electrode, the at least one common electrode being formed above the plurality of pixel electrodes on the substrate such that at least a portion of the at least one common electrode overlaps each of the plurality of pixel electrodes in plan view;

an insulating layer, the insulating layer being formed on the substrate between the plurality of pixel electrodes and the at least one common electrode;

a material, the material having characteristics such that the material is driven by an electric held that is generated on the basis of an electric potential formed between each of the plurality of pixel electrodes and the at least one common electrode;

the at least one common electrode including a plurality of slits, the plurality of slits at least partially overlapping the plurality of pixel electrodes in plan view and each of the plurality of slits including at least one continuous portion;

the at least one continuous portion extending over the plurality of sub-pixels of one of the plurality of pixels, the at least one continuous portion extending in an extending direction;

the extending directions of the at least one continuous portion of adjacent pixels of the plurality of pixels being different.

15. The apparatus according to claim 14,
the extending direction being different among the n pixels that are arranged adjacent to one another in a direction, and
the continuous portions having the same extending direction being repeatedly arranged every n pixels in a line of the pixels, n being a positive integer.

16. The apparatus according to claim 14,
an angle that the extending direction of the at least one continuous portion makes with the alignment direction being larger than 0 degree and smaller than 45 degrees, and
the liquid crystal having a positive anisotropy of dielectric constant.

17. The liquid crystal device according to claim 14,
an angle that the extending direction of the at least one continuous portion makes with the alignment direction being larger than 45 degrees and smaller than 90 degrees, and
the liquid crystal having a negative anisotropy of dielectric constant.

18. An apparatus according to claim 14, the electronic apparatus being at least one of a cellular phone, a mobile computer, a digital camera, a digital video camera, an in-vehicle equipment, a digital video camera, an in-vehicle equipment, and an audio instrument.

* * * * *